United States Patent
Ueno et al.

(10) Patent No.: US 9,911,304 B2
(45) Date of Patent: Mar. 6, 2018

(54) DISTRIBUTED CONTROL METHOD, DISTRIBUTED CONTROL SYSTEM, AND NON-TRANSITORY COMPUTER-READABLE STORAGE MEDIUM

(71) Applicant: FUJITSU LIMITED, Kawasaki-shi, Kanagawa (JP)

(72) Inventors: Hitoshi Ueno, Kawasaki (JP); Kenichi Abiru, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/295,182

(22) Filed: Oct. 17, 2016

(65) Prior Publication Data

US 2017/0109995 A1  Apr. 20, 2017

(30) Foreign Application Priority Data

Oct. 20, 2015 (JP) ................. 2015-206704

(51) Int. Cl.
| | | |
|---|---|---|
| G08B 1/00 | (2006.01) | |
| G08B 21/18 | (2006.01) | |
| G05B 19/418 | (2006.01) | |

(52) U.S. Cl.
CPC ....... *G08B 21/18* (2013.01); *G05B 19/41815* (2013.01); *G05B 2219/25056* (2013.01); *G05B 2219/25413* (2013.01)

(58) Field of Classification Search
CPC .............. G08B 21/18; G05B 19/41815; G05B 2219/25413
USPC .......................... 340/539.1, 539.11, 506, 3.1
See application file for complete search history.

(56) References Cited

U.S. PATENT DOCUMENTS

| | | | | | |
|---|---|---|---|---|---|
| 5,400,246 | A | * | 3/1995 | Wilson | G06F 3/023 340/12.53 |
| 5,959,529 | A | * | 9/1999 | Kail, IV | G01S 19/17 128/903 |
| 2007/0073822 | A1 | | 3/2007 | Bennett et al. | |

FOREIGN PATENT DOCUMENTS

| | | |
|---|---|---|
| JP | 2001-186210 | 7/2001 |
| JP | 2009-163753 | 7/2009 |
| JP | 2011-53978 | 3/2011 |
| JP | 2011-72004 | 4/2011 |
| WO | 03/083703 A1 | 10/2003 |

\* cited by examiner

*Primary Examiner* — Daryl Pope
(74) *Attorney, Agent, or Firm* — Staas & Halsey LLP

(57) ABSTRACT

A distributed control method in a distributed control system including a process executed by a by a first notification device, the process including notifying a detection of a first event to a second notification device, storing, in a storage device, acknowledgement information associating an event identifier indicating the first event with a device identifier indicating the second notification device when a negative acknowledgement is received from the second notification device, determining whether the event identifier indicating the first event is stored in the storage device or not when a request for a notification of the detection of the first event is received from a third notification device, and deleting, from the storage device, a device identifier associated with the event identifier indicating the first event when it is determined that the event identifier indicating the first event is stored in the storage device.

7 Claims, 21 Drawing Sheets

DISTRIBUTED CONTROL METHOD, DISTRIBUTED CONTROL SYSTEM, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2015-206704, filed on Oct. 20, 2015, the entire contents of which are incorporated herein by reference.

FIELD

The embodiment discussed herein is related to a distributed control method, a distributed control system, and a non-transitory computer-readable storage medium.

BACKGROUND

In the related art, there is a technology in which each notification device of a plurality of notification devices cooperates with a detection device detecting a certain event in a plurality of events, and executes each process into which processes according to the plurality of events are divided, and thus, the plurality of notification devices execute a distributed process.

Examples of a technology of the related art include a technology in which instruction information indicating transmission failure of notification is received and the notification is retransmitted according to the instruction information, with respect to a publish-subscribe network. In addition, there is a technology in which, in a case where a certain node secedes from a logical channel in which the certain node participates in advance, the certain node retrieves a table managing an owner of a logical channel of the node, and performs unicast transmission with respect to data indicating a secession request according to the retrieved owner. In addition, there is a technology in which, in a case where a timely acknowledgement in response to a requested acknowledgement is received, all outstanding messages associated with the received acknowledgement are removed from a retransmission queue.

Japanese Laid-open Patent Publication Nos. 2009-163753, 2011-53978, 2001-186210, and 2011-72004 are examples of related art.

SUMMARY

According to an aspect of the invention, A distributed control method in a distributed control system including a plurality of notification devices and at least one detection device which notifies detection of an event to a notification device that corresponds to a position of the detection device among from the plurality of notification devices, the distributed control method including a process executed by a by a first notification device included in the plurality of notification devices, the process including notifying a detection of a first event to a second notification device included in the plurality of notification devices when the detection of the first event is received from the at least one detection device detecting the first event, the first notification device being capable of receiving a detection of the first event from the at least one detection device, the second notification device being capable of receiving a detection of a second event from the at least one detection device, storing, in a storage device, acknowledgement information associating an event identifier indicating the first event with a device identifier indicating the second notification device when a negative acknowledgement indicating that a processing according to the detection of the first event is not able to be executed is received from the second notification device, determining whether the event identifier indicating the first event is stored in the storage device or not when a request for a notification of the detection of the first event is received from a third notification device included in the plurality of notification devices, the third notification device being capable of receiving a detection of a second event is from the at least one detection device, and deleting, from the storage device, a device identifier associated with the event identifier indicating the first event when it is determined that the event identifier indicating the first event is stored in the storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
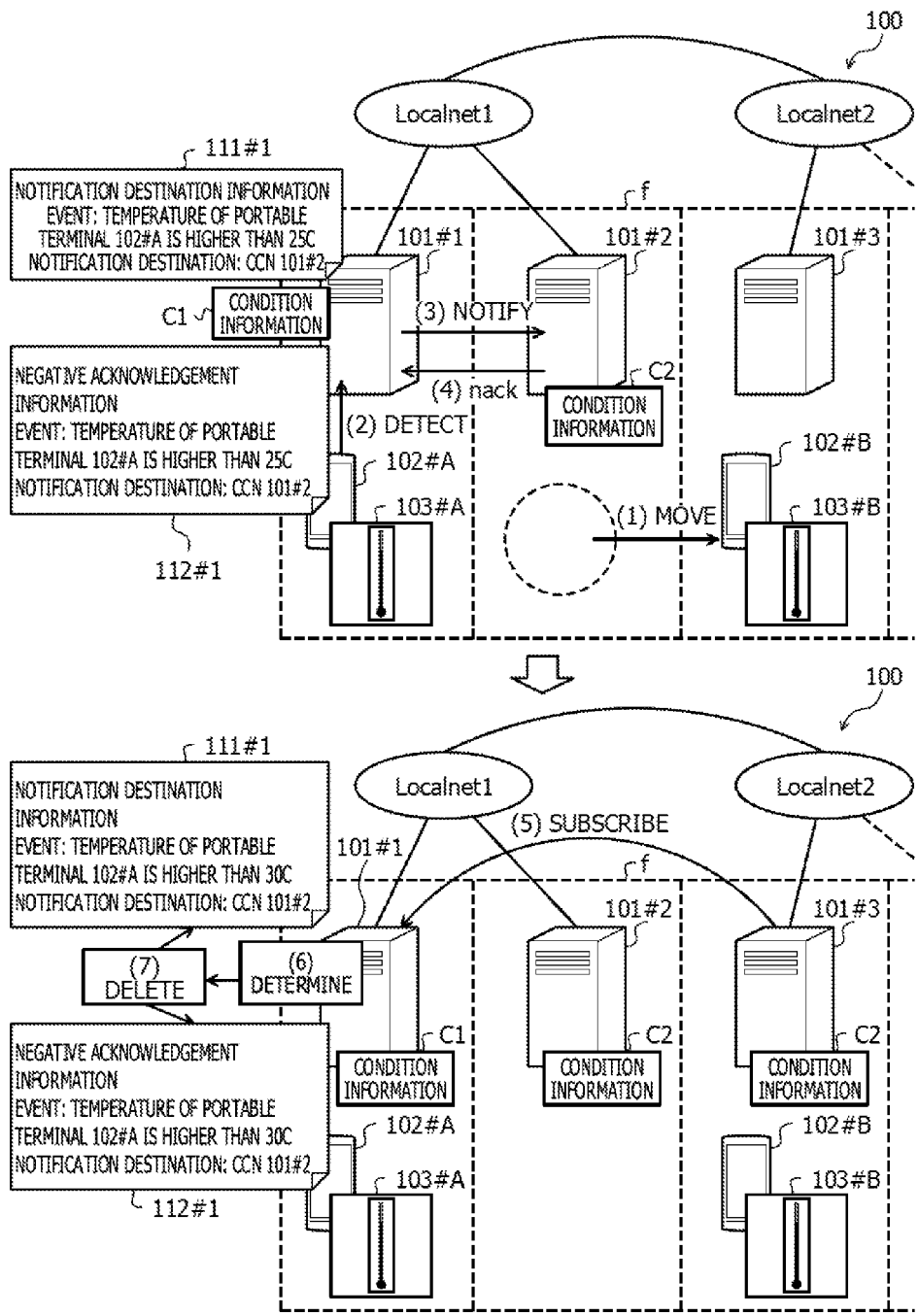
FIG. 1 is an explanatory diagram illustrating an operation example of a distributed control system according to this embodiment.

However, according to the related art technology, there is a case where each of the notification devices of the plurality of notification devices cooperates with the detection device detecting the certain event in the plurality of events, and executes each of the processes into which the processes according to the plurality of events are divided, but the distributed process executed by the plurality of notification devices is not able to be continued.

For example, in the distributed process, in a case where a certain detection device detects a certain event, a certain notification device connected to the certain detection device notifies the detection of the certain event to another notification device, and the another notification device inquires the presence or absence of the detection of another event of the another detection device as a process according to the detection of the certain event. In such a case, there is a case where the another detection device is moved, and in a case where the another detection device is moved, there is a case where the distributed process is not able to be continued. Specifically, the certain notification device, and a notification device of a move source of the another detection device, and a notification device of a move destination of the another detection device are not able to specify where the another detection device is moved from, and thus, the distributed process is not able to be continued.

Specifically, the notification device of the move destination and the notification device of the move source are not able to be specified. In addition, the notification device of the move source is not able to communicate with the another detection device, but it is not able to specify whether the notification device of the move source is not able to communicate with the another detection device due to congestion of communication, due to no supply of a power source of the another detection device, or due to the movement of the another detection device. In addition, in a case where the detection of the certain event is notified to the notification device of the move source, the certain notification device receives a negative acknowledgement to the fact that a process according to the detection of the certain event is not able to be executed, but in the negative acknowledgement, it is not possible to specify whether or not the another detection device is moved.

An object of one aspect is to provide a distributed control method, a distributed control system, and a distributed control program, in which each notification device of a plurality of notification devices cooperates with a detection device detecting a certain event in a plurality of events, and executes each process into which processes according to the plurality of events are divided, and thus, a distributed process executed by the plurality of notification devices is able to be continued.

Hereinafter, embodiments of a distributed control method, a distributed control system, and a distributed control program disclosed herein will be described in detail with reference to the drawings.

FIG. 1 is an explanatory diagram illustrating an operation example of a distributed control system 100 according to this embodiment. The distributed control system 100 is a system providing a service in which notification is sent to a user when an attribute of a field satisfies any condition. The distributed control system 100 includes a plurality of notification devices, and a detection device which notifies the detection of an event to a notification device according to a position of the detection device. Other devices included in the distributed control system 100 will be described with reference to FIG. 2. The plurality of notification devices are arranged in a plurality of portions in the field, respectively, and in a case where the condition received from the user is established, this is notified to the user by applying information designated by the condition. Hereinafter, the notification device will be referred to as condition check node (CCN).

The detection device is a device which detects an event. For example, the detection device is a portable terminal, a laptop PC, or the like. In an example described below, the detection device will be described as a portable terminal. The event is a result obtained by observation. For example, the event is able to be acquired by a sensor included in the portable terminal. A detection example of the event include a case where a temperature measured by a temperature sensor included in the portable terminal is higher than or equal to a predetermined threshold value or a case where a sound pressure measured by a sound sensor included in the portable terminal is higher than or equal to a predetermined threshold value. Alternatively, in the detection of the event, the temperature may be simply acquired from the temperature sensor included in the portable terminal. Alternatively, the temperature may be acquired from the temperature sensor included in the portable terminal, the acquired temperature may be notified to the CCN, the CCN may compare the notified temperature with a predetermined threshold value, and in a case where the notified temperature is higher than or equal to the predetermined threshold value, the event may be detected.

The field, for example, is a factory, an agricultural field, or the like. For example, the field is set to a factory. Then, in a usual state, a power source of air-conditioning equipment in the factory is turned on, but in a case where a temperature of a certain chamber in the factory is higher than or equal to a certain temperature, and a temperature of another chamber in the factory is lower than or equal to a certain temperature, the power source of the air-conditioning equipment in the factory is turned off. In this case, the distributed control system 100 is applied to the factory, and thus, in a case where the temperature of the certain chamber in the factory is higher than the certain temperature, and the temperature of the another chamber in the factory is lower than or equal to the certain temperature, a manager is able to receive a notification. The manager, who has received the notification, is able to turn the power source of the air-conditioning equipment in the factory off.

In addition, in another example, the field is set to a plurality of agricultural fields. Then, in a usual state, the plurality of agricultural fields are treated with agrichemical pesticide, but in a case where a temperature of a certain agricultural field in the plurality of agricultural fields is higher than or equal to a certain temperature, and a temperature of another agricultural field in the plurality of agricultural fields is lower than or equal to a certain temperature, the agricultural field is not treated with the agrichemical pesticide. In this case, the distributed control system 100 is applied to the plurality of agricultural fields, and thus, in a case where the temperature of the certain agricultural field is higher than or equal to the certain temperature, and the temperature of the another agricultural field is lower than or equal to the certain temperature, a manager of the plurality of agricultural fields is able to receive a notification. The manager who has received the notification is able to stop the treatment of the agrichemical pesticide.

In order to provide such a service, the distributed control system 100 performs a distributed process which is realized by allowing a plurality of CCNs to cooperate with the portable terminal, and to execute each process into which processes according to a plurality of events are divided. For example, in a case where a certain portable terminal detects a certain event, a certain CCN connected to the certain portable terminal notifies the detection of the certain event to another CCN by assuming that a certain determination process is established. The another CCN which has received the notification of the detection of the certain event performs another determination process as a process according to the detection of the certain event. Then, the another CCN inquires another portable terminal of the presence or absence of the detection of another event in a condition determination process. Here, in a case where communication with respect to the another portable terminal is not able to be performed, the another CCN is not able to continue the distributed process. Therefore, in a case where the communication with respect to the another portable terminal is not able to be performed, the another CCN performs the same notification a predetermined number of times. In this case, the occurrence of the same notification increases as the number of portable terminals increases.

In addition, there is a case where the another portable terminal is moved, and in a case where the another portable terminal is moved, there is a case where the distributed process is not able to be continued. Specifically, the certain CCN, a CCN of a move source of the another portable terminal, and a CCN of a move destination of the another portable terminal are not able to specify where the another CCN is moved from, and thus, the distributed process is not able to be continued.

Specifically, the CCN of the move destination is not able to specify the CCN of the move source. In addition, the CCN of the move source is not able to communicate with the another portable terminal, but it is not able to specify whether the CCN of the move source is not able to communicate with the another portable terminal due to congestion of communication, due to no supply of a power source of the another detection device, or due to the movement of the another detection device. In addition, in a case where the detection of the certain event is notified to the CCN of the move source, the certain CCN receives a negative acknowledgement to the fact that a process according to the detection of the certain event is not able to be executed, but in the negative acknowledgement, it is not possible to specify whether or not the another portable terminal is moved. In addition, the another portable terminal merely stores a representative uniform resource locator (URL) of the CCN.

Therefore, in this embodiment, a case will be described, in which the certain CCN receives a negative acknowledgement from the CCN of the move source to which the establishment of a certain condition has been notified in the determination process, and receives a request for the notification of the establishment of the certain condition from the CCN of the move destination, and then, a notification destination at the time of establish the certain condition is changed to the CCN of the move destination.

Specifically, the operation example of the distributed control system 100 will be described by using FIG. 1. The distributed control system 100 illustrated in FIG. 1 includes CCNs 101#1 to 101#3, and portable terminals 102#A and 102#B. The entire distributed control system 100 will be described with reference to FIG. 2. In addition, the portable terminals 102#A and 102#B are sensors used for detecting an event, and respectively include temperature sensors 103#A and 103#B. The CCNs 101#1 and 101#2 are connected to each other through Localnet1. In addition, the CCN 101#3 is connected through Localnet2. The Localnets 1 and 2 are connected to each other.

Here, the CCN 101#1 illustrated in FIG. 1 stores condition information C1 indicated by a determination process which becomes a process of a part of the distributed process. In a case where a first event of "the temperature of the portable terminal 102#A is higher than 30° C." is detected, the condition information C1 indicates that a process of notifying the detection of the first event to the CCN 101#2 is performed. Similarly, the CCN 101#2 stores condition information C2 indicated by a determination process which becomes a process of a part of the distributed process. In a case where the detection of the first event is received from the CCN 101#1, and a second event of "the temperature of the portable terminal 102#B is lower than 25° C." is detected, the condition information C2 indicates that a process of sending the notification to a user is performed.

Hereinafter, for the sake of simple description, a reference numeral to which a code of "#Number" is applied is relevant to "CCN 101#Number". In addition, a reference numeral to which a code of "#Alphabet" is applied is relevant to "portable terminal 102#Alphabet".

In addition, the CCNs 101#1 to 101#3 are respectively arranged in a region into which a field f is divided. In addition, in an example of FIG. 1, the portable terminal 102#A exists in the region of the CCN 101#1. Accordingly, the portable terminal 102#A is connected to the CCN 101#1 in the closest position based on the position of the portable terminal 102#A. Similarly, the portable terminal 102#B is connected to the CCN 101#2 in the closest position based on the position of the portable terminal 102#B. In the following description, in a case where a portable terminal 102 exists in the region of a certain CCN 101, there is a case where the portable terminal 102 is referred to as "a portable terminal 102 in a position under the certain CCN 101". The CCN 101#1 and the portable terminal 102#A are connected to each other through wireless or wired communication. Similarly, the CCN 101#2 and the portable terminal 102#B are connected to each other through wireless or wired communication.

In addition, the CCN 101#1 stores notification destination information 111#1 managing the notification destination to which the detection of the event has been notified. Here, in notification destination information 111, identification information of a device which has received a request for the notification of the detection of the event is stored in association with information identifying an event. Hereinafter, the request for the notification of the detection of the event will be referred to as "subscription". There is a case where a device performing the subscription is a device itself which becomes the notification destination of the detection of the event, and there is a case where the device performing the subscription is another device different from the device which becomes the notification destination of the detection of the event.

In such a state, as illustrated in (1) in the upper portion of FIG. 1, the portable terminal 102#B is moved to a position under the CCN 101#3 from a position under the CCN 101#2. The portable terminal 102#B is moved, and then, as illustrated in (2) in the upper portion of FIG. 1, the CCN 101#1 which becomes a first notification device accesses the portable terminal 102#A, and the first event of "the temperature of the portable terminal 102#A is higher than 30° C." is detected.

In a case where the first event is detected, as illustrated in (3) in the upper portion of FIG. 1, the CCN 101#1 notifies the detection of the first event to the CCN 101#2 which becomes a second notification device. The CCN 101#2 which has received the notification executes a process according to the detection of the first event, and thus, tries to access the portable terminal 102#B, but the portable terminal 102#B is moved in advance, and thus, the CCN 101#2 is not able to access the portable terminal 102#B. Accordingly, the CCN 101#2 performs retry predesignated number of times, and then, as illustrated in (4) in the upper portion of FIG. 1, notifies a negative acknowledgement (nack) of the fact that the process according to the detection of the first event is not able to be executed.

In a case where the nack is received, the CCN 101#1 associates identification information of the first event and identification information of the CCN 101#2 with each other, and stores the identification information in negative acknowledgement information 112#1. The CCN 101#1 performs retransmission of the detection of the first event by referring to the negative acknowledgement information 112#1.

Next, as illustrated in (5) of the lower portion of FIG. 1, the CCN 101#1 receives the subscription of the detection of the first event from the CCN 101#3 which becomes a third notification device. Here, the CCN 101#3 transmits the subscription of the detection of the first event to the CCN 101#1 based on the condition information C2. A method in which the CCN 101#3 acquires the condition information C2 will be described with reference to FIG. 6.

Then, as illustrated in (6) in the lower portion of FIG. 1, the CCN 101#1 determines whether or not the identification information of the CCN 101#2 which is included in the negative acknowledgement information 112#1 is able to be deleted according to the fact that the subscription of the detection of the first event is received. For example, the CCN 101#1 compares the number of times of receiving the subscription with the number of devices which have transmitted a negative acknowledgement included in the negative acknowledgement information 112#1 at each event, and in a case where the numbers are coincident with each other, it is determined that the identification information of the CCN 101#2 is able to be deleted.

Alternatively, in the example of FIG. 1, it is assumed in advance that only one CCN 101 performing the subscription with respect to the first event exists in the distributed control system 100 at the same time. For example, this is a time point at which a device into which the condition designated by the user is divided is able to determine that the detection of the first event is notified to one CCN 101. In such a case, in a case where the subscription of the detection of the first event is received from the CCN 101#3, the CCN 101#1 determines whether or not the identification information of the first event is included in negative acknowledgement information 112. Then, in a case where the identification information of the first event is included in the negative acknowledgement information 112, it is determined that the identification information of the CCN 101#2 is able to be deleted.

In the example of FIG. 1, the CCN 101#1 determines that the identification information of the CCN 101#2 is able to be deleted, and as illustrated in (7) in the lower portion of FIG. 1, the identification information of the CCN 101#2 which is associated with the first event is deleted from the notification destination information 111 and the negative acknowledgement information 112. Accordingly, the distributed control system 100 is able to continue the distributed process. Next, the entire distributed control system 100 will be described by using FIG. 2.

Figure 2:
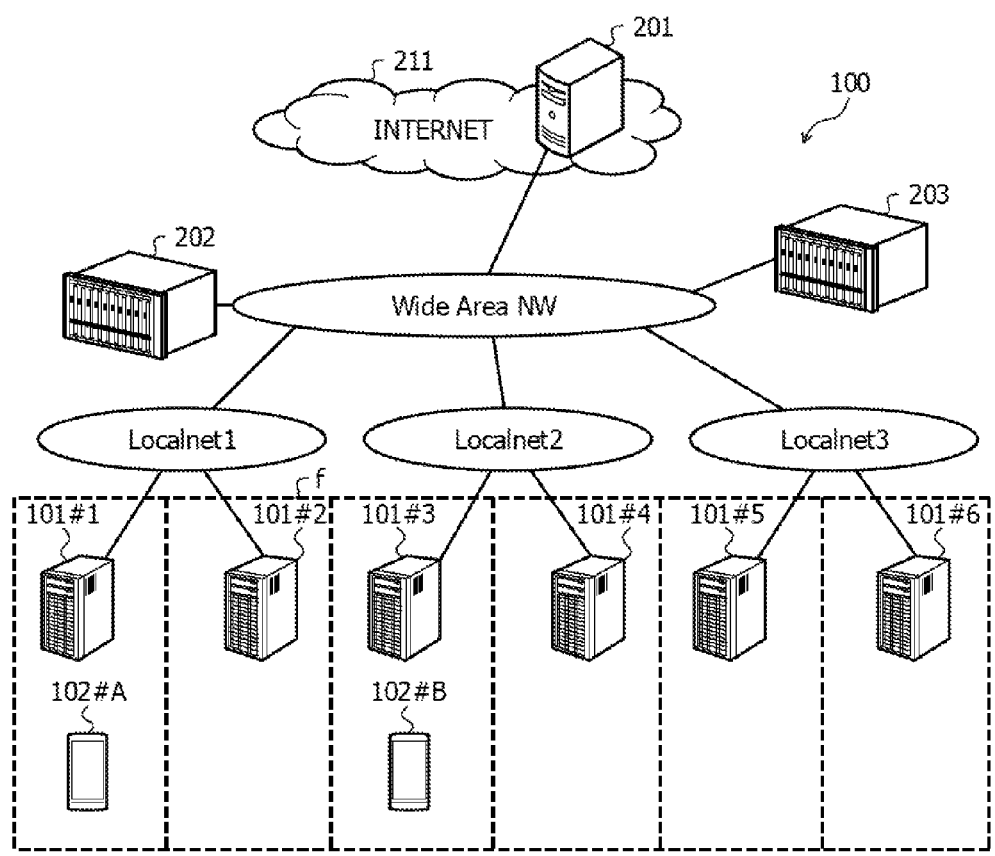
FIG. 2 is an explanatory diagram illustrating an example of the distributed control system.

FIG. 2 is an explanatory diagram illustrating an example of the distributed control system 100. The distributed control system 100 includes a service user server (SUS) 201, a condition management server 202, a position management server 203, CCNs 101#1 to 101#6, and the portable terminals 102#A and 102#B. In addition, the condition management server 202, the position management server 203, and the CCNs 101#1 to 101#6 are connected to each other through Wide Area NW. In addition, the CCNs 101#1 and 101#2 are connected through the Localnet1. In addition, the CCNs 101#3 and 101#4 are connected to each other through the Localnet2. In addition, the CCNs 101#5 and 101#6 are connected to each other through Localnet3. The Wide Area NW is connected to the Localnet1 to the Localnet3.

The SUS 201 is a server which receives the condition from the user. The SUS 201 is connected to the CCNs 101#1 to 101#6, the condition management server 202, and the position management server 203 through internet 211.

The position management server 203 manages the position of the portable terminal 102 of the user. The condition management server 202 divides the condition received in the SUS 201 which is used in the position information of the portable terminal 102 included in the position management server 203, and distributes the divided condition to the CCN 101 in the vicinity of the portable terminal 102. Here, when the condition is established, the condition management server 202 divides the condition such that the notification is able to be performed as soon as possible. In addition, the condition management server 202 divides the condition such that acquisition or distribution of monitoring information used in the condition determination is performed by available traffic costs. For example, the condition management server 202 divides the condition such that the number of hops decreases as communication costs. Accordingly, the condition management server 202 divides the condition such that notification after establishing the condition is performed for a predetermined period of time, and traffic applied to the distributed control system 100 is minimized.

The CCNs 101#1 to 101#6 are respectively arranged in the region into which the field f is divided. In addition, in an example of FIG. 2, the portable terminal 102#A exists in the region of the CCN 101#1. In addition, the portable terminal 102#B exists in the region of the CCN 101#3.

Figure 3:
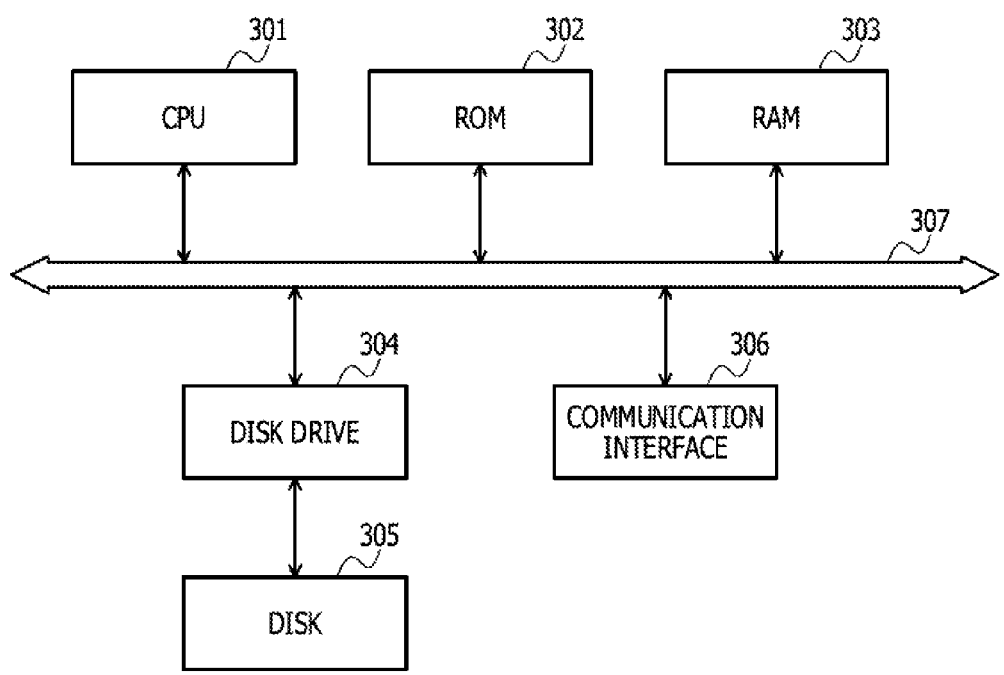
FIG. 3 is an explanatory diagram illustrating a hardware configuration example of a server.

FIG. 3 is an explanatory diagram illustrating a hardware configuration example of a server. Here, the server is the CCN 101 which is illustrated in FIG. 1, the SUS 201, the condition management server 202, and the position management server 203 which are illustrated in FIG. 2. In FIG. 3, the server includes a CPU 301, a read-only memory (ROM) 302, and an RAM 303. In addition, the server includes a disk drive 304 and a disk 305, and a communication interface 306. In addition, the CPU 301 to the disk drive 304 and the communication interface 306 are connected to each other through a bus 307.

The CPU 301 is an arithmetic processing device controlling the entire server. In addition, the server may include a plurality of CPUs. The ROM 302 is a non-volatile memory storing a program such as a boot program. The RAM 303 is a volatile memory used as a work area of the CPU 301.

The disk drive 304 is a control device controlling reading and writing of data with respect to the disk 305 according to the control of the CPU 301. For example, a magnetic disk drive, an optical disk drive, a solid state drive, and the like are able to be adopted as the disk drive 304. The disk 305 is a non-volatile memory storing data which is written by controlling the disk drive 304. For example, in a case where the disk drive 304 is a magnetic disk drive, a magnetic disk is able to be adopted as the disk 305. In addition, in a case where the disk drive 304 is an optical disk drive, an optical disk is able to be adopted as the disk 305. In addition, in a case where the disk drive 304 is a solid state drive, a semiconductor memory formed by a semiconductor element and a so-called semiconductor disk are able to be adopted as the disk 305.

The communication interface 306 is a control device which manages a network and an internal interface, and controls input and output of data from another device. Specifically, the communication interface 306 is connected to the another device via a network through a communication line. For example, a modem, a local area network (LAN) adapter, or the like is able to be adopted as the communication interface 306.

In addition, in a case where the manager of the distributed control system 100 directly operates the server, the server may include hardware such as a display, a keyboard, and a mouse.

Figure 4:
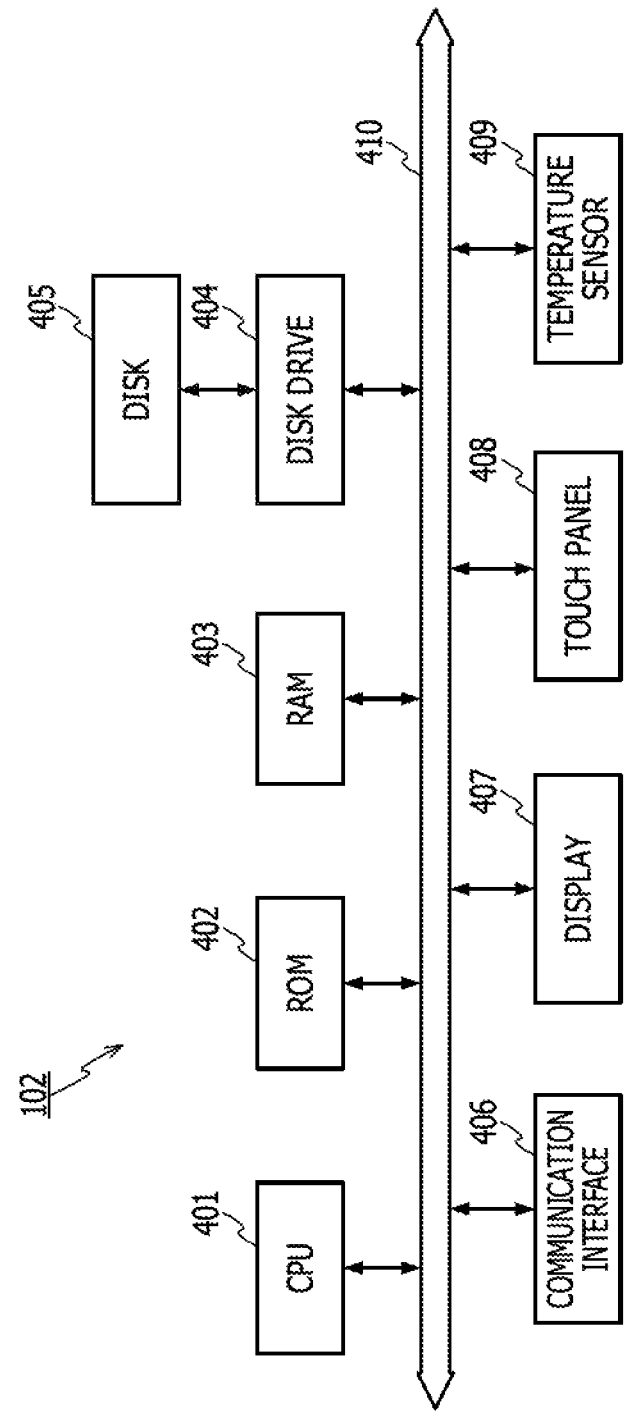
FIG. 4 is an explanatory diagram illustrating a hardware configuration example of a portable terminal.

FIG. 4 is an explanatory diagram illustrating a hardware configuration example of the portable terminal 102. In FIG. 4, the portable terminal 102 includes a CPU 401, an ROM 402, an RAM 403, a disk drive 404, a disk 405, a communication interface 406, a display 407, a touch panel 408, and a temperature sensor 409. In addition, the CPU 401 to the disk drive 404 and the communication interface 406 to the temperature sensor 409 are connected to each other through a bus 410.

Here, the CPU 401 controls the entire portable terminal 102. The ROM 402 stores a program such as a boot program. The RAM 403 is used as a work area of the CPU 401. The disk drive 404 controls reading/writing of data with respect to the disk 405 according to the control of the CPU 401. The disk 405 stores data which is written by controlling the disk drive 404. For example, a solid state drive or the like is able to be adopted as the disk drive 404. In a case where the disk drive 404 is a solid state drive, a semiconductor memory, and a so-called semiconductor disk are able to be adopted as the disk 405.

The communication interface 406 is connected to a network through a communication line, and is connected to another computer through the network. Then, the communication interface 406 manages the network and an internal interface, and controls input and output of data from the another computer.

The display 407 displays data such as a cursor, an icon, a toolbox, a document, an image, and function information. For example, a thin film transistor (TFT) liquid crystal display or the like is able to be adopted as the display 407.

Figure 5:
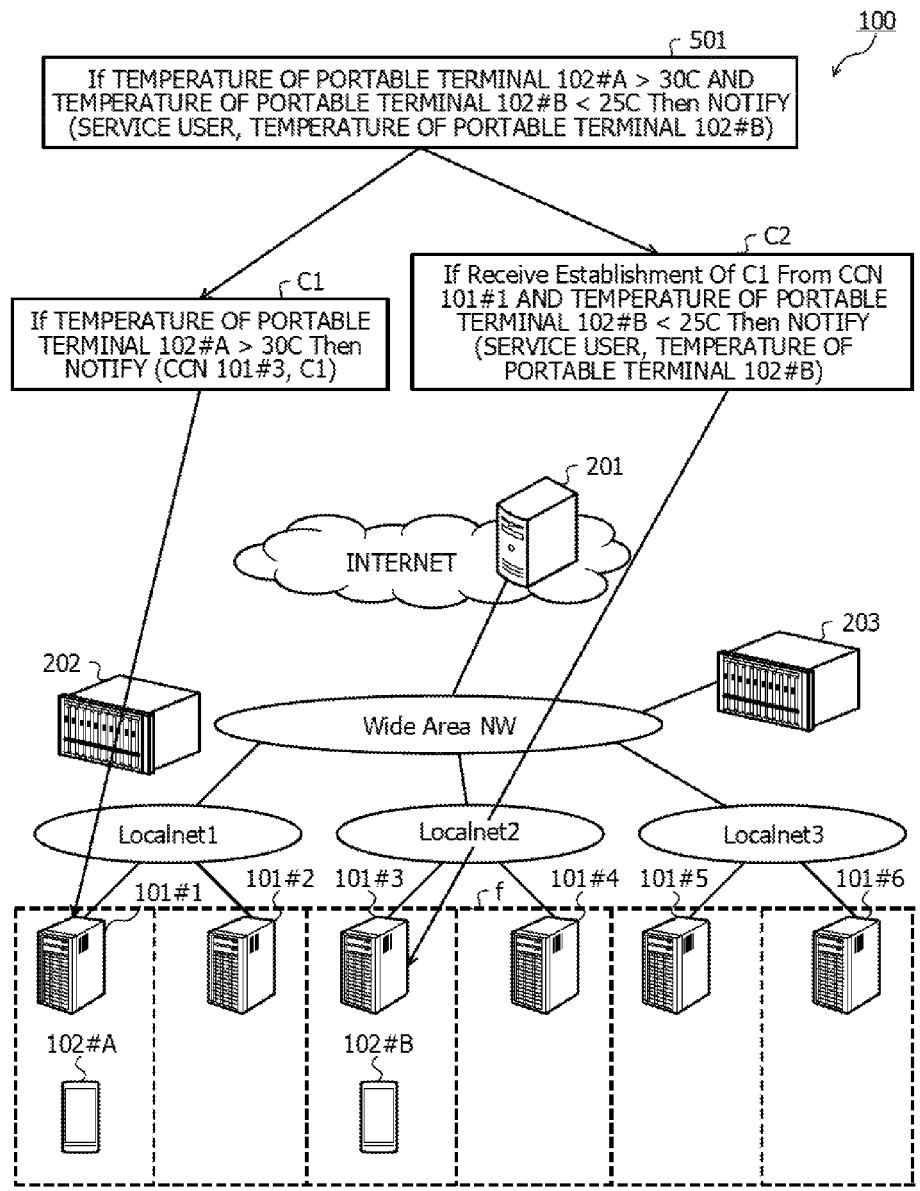
FIG. 5 is an explanatory diagram illustrating an example of a distributed process of condition determination.

The touch panel 408 detects a touch operation or a drag operation of the user. The temperature sensor 409 is a sensor which obtains an atmospheric temperature around the portable terminal 102. Furthermore, the portable terminal 102 illustrated in FIG. 5 is a smart phone or a tablet terminal. In addition, the portable terminal 102 may be a portable telephone. In addition, the portable terminal 102 may include a sensor such as a sound sensor, a humidity sensor, and a photometric sensor. In addition, the distributed control system 100 may use a portable laptop PC as the detection device instead of the portable terminal 102. Next, an example of the distributed process of the condition determination will be described by using FIG. 5.

FIG. 5 is an explanatory diagram illustrating an example of the distributed process of the condition determination. In a case where the condition registered from the SUS 201 is formed by the information of the portable terminals 102 which are in the plurality of portions, the condition management server 202 divides the condition, and distributes the divided condition to the CCN 101 in the vicinity of the portable terminal 102. Accordingly, the condition management server 202 distributes the condition determination.

In the example of FIG. 5, the contents of condition information 501 registered from the SUS 201 is set to "If Temperature of Portable Terminal 102#A>30° C. AND Temperature of Portable Terminal 102#B<25° C. Then Notify (Service User, Temperature of Portable Terminal 102#B)". Here, the temperature of the portable terminals 102#A and 102#B indicates a temperature measured by the temperature sensor included in the portable terminals 102#A and 102#B. In addition, the notification (the service user, the temperature of the portable terminal 102#B) indicates notification of the temperature measured by the temperature sensor included in the portable terminal 102#B to the service user.

The condition management server 202 which has received the condition information 501 divides the condition information 501 into the condition information C1 and the condition information C2 based on the position of the portable terminals 102#A and 102#B obtained from the position management server 203. As illustrated in FIG. 5, the portable terminal 102#A is in the vicinity of the CCN 101#1, and the portable terminal 102#B is in the vicinity of the CCN 101#3.

The contents of the condition information C1 are "If Temperature of Portable Terminal 102#A>30° C. Then Notify (CCN 101#3, C1)". Here, the notification (CCN 101#3, C1) indicates that the establishment of a condition indicated by the condition information C1 is notified to the CCN 101#3. In addition, the contents of the condition information C2 are "If Receive Establishment of C1 from CCN 101#1 AND Temperature of Portable Terminal 102#B<25° C. Then Notify (Service User, Temperature of Portable Terminal 102#B)". Next, a setting example of the condition information with respect to the portable terminal 102 will be described by using FIG. 6.

Figure 6:
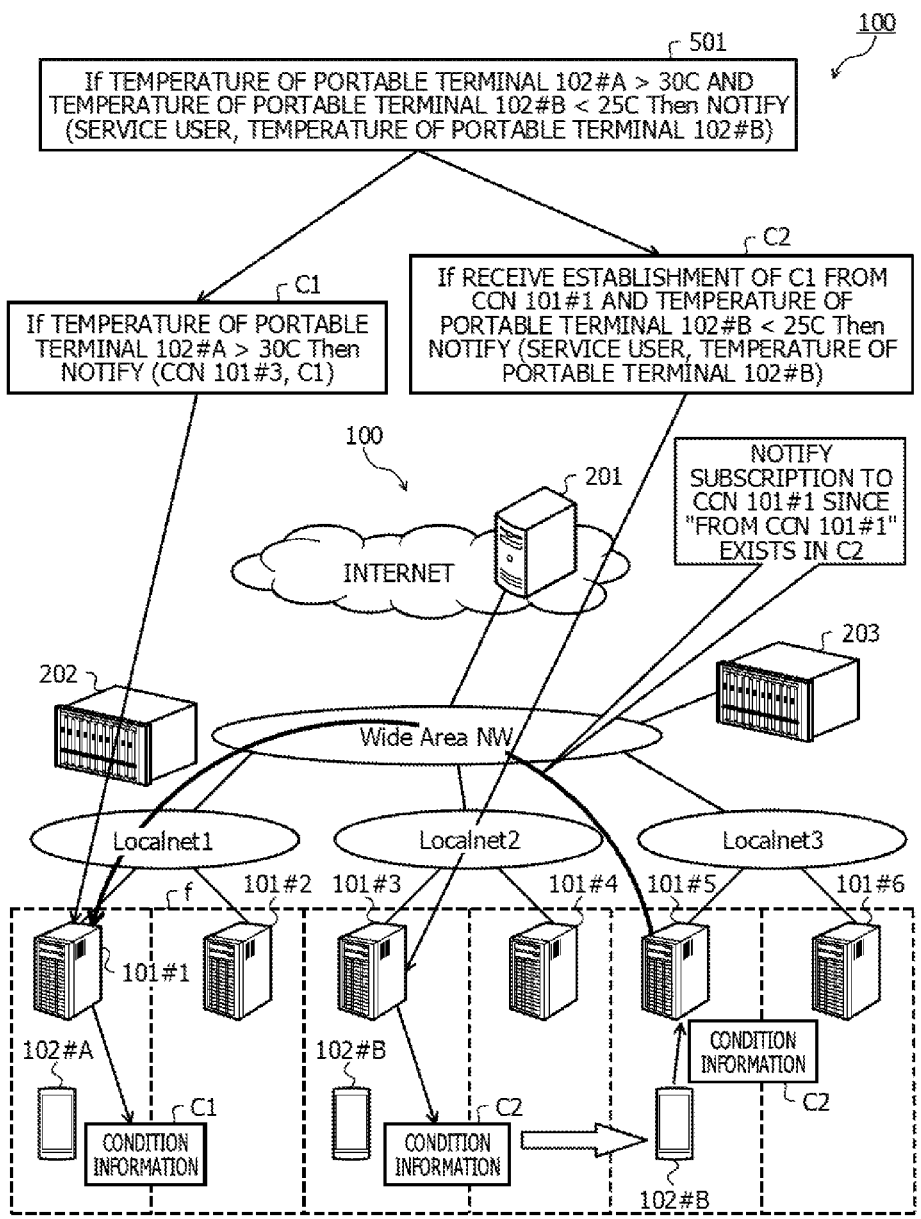
FIG. 6 is an explanatory diagram illustrating a setting example of condition information with respect to the portable terminal.

FIG. 6 is an explanatory diagram illustrating a setting example of the condition information with respect to the portable terminal 102. The distributed control system 100 stores the condition information which is even divided into the portable terminal 102. Then, the portable terminal 102, for example, is moved to a position under the another CCN 101 from a position under the current CCN 101 by the movement of the user of the portable terminal 102. In this case, the moved portable terminal 102 notifies the stored condition information to the CCN 101 of the move destination. Accordingly, it is possible to reduce a load applied to a condition setting process from the condition management server 202 to the CCN 101.

Specifically, in a case where the condition information is set from the condition management server 202, the CCN 101 sets the condition information even in the portable terminal 102 in which ID is included between If and Then of the set condition information. In addition, the CCN 101 in which new condition information is set notifies the subscription to the another CCN 101 in a case where there is ID of the another CCN 101 between If and Then of the new condition information.

In the example of FIG. 6, the portable terminal 102#B is moved to a position under the CCN 101#5 from the position under the CCN 101#3. After being moved, the portable terminal 102#B notifies the condition information C2 to the CCN 101#5. The CCN 101#5 which has received the condition information C2 notifies the subscription to the CCN 101#1 since "from CCN 101#1" exists between If and Then of the condition information C2.

Figure 7:
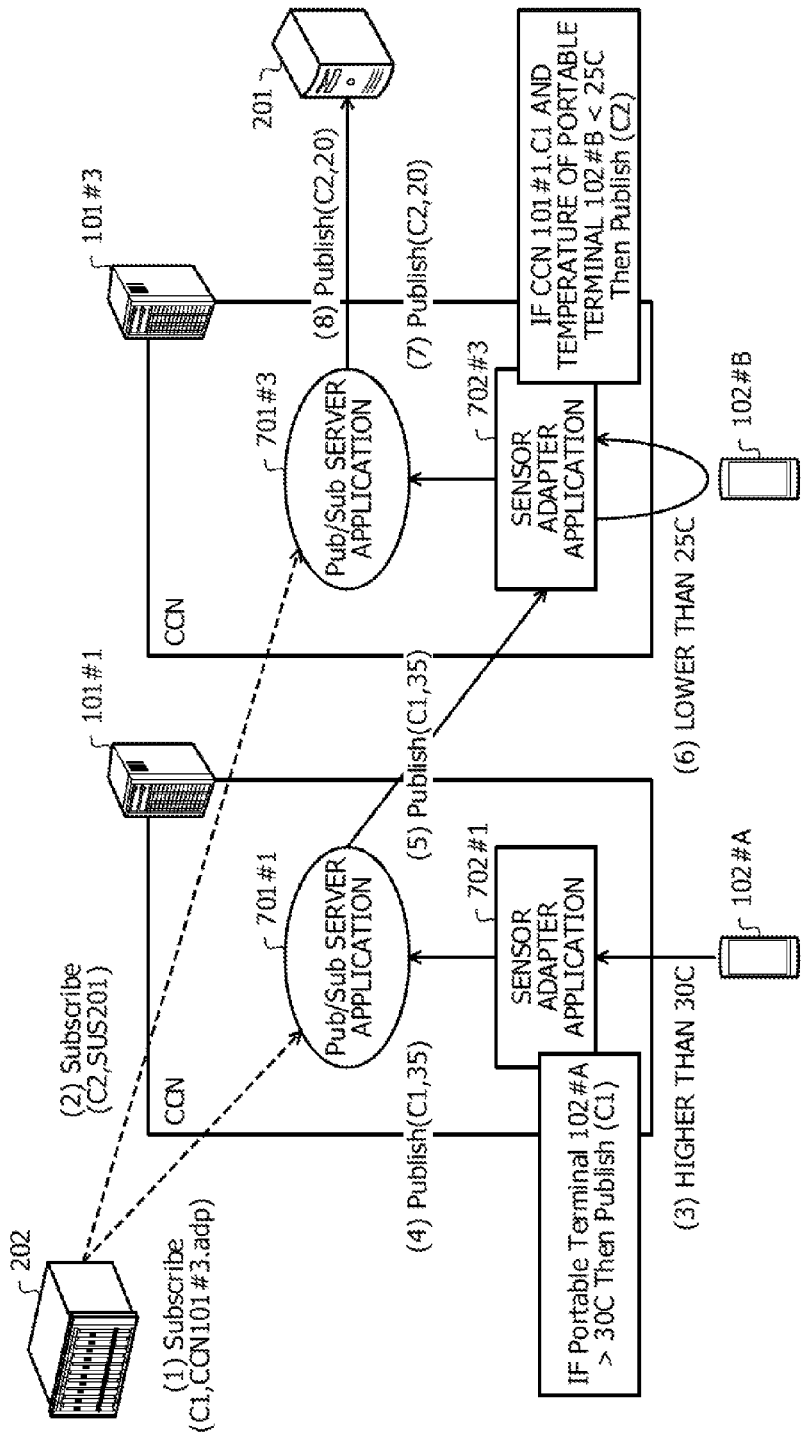
FIG. 7 is an explanatory diagram illustrating an execution example of a distributed process of condition determination using a Pub/Sub technology.

FIG. 7 is an explanatory diagram illustrating an execution example of a distributed process of condition determination using a Pub/Sub technology. In FIG. 7, an example is illustrated in which the distributed control system 100 is realized by using the Pub/Sub technology. The Pub/Sub technology is converted into middleware by open source software (OSS) or the like, and decreases development man hour, and thus, is mostly used.

In the Pub/Sub technology, a Publish message and a Subscribe message are used. In the following description, the Publish message will be simply referred to as "Publish". Similarly, the Subscribe message will be simply referred to as "Subscribe".

Specifically, a Pub/Sub server application 701 and a sensor adapter application 702 operate on the CCN 101. The Pub/Sub server application 701 is software realizing the Pub/Sub technology. The sensor adapter application 702 is software which receives a request, and processes the request according to an applied operation.

Specifically, in a process of (1) illustrated in FIG. 7, the condition management server 202 notifies Subscribe (C1, CCN 101#3.adp) to a Pub/Sub server application 701#1 of the CCN 101#1. Here, Subscribe ( ) is a message of performing the subscription illustrated in FIG. 1. A first parameter of the Subscribe ( ) indicates identification information of information to which a device which becomes a subscription destination subscribes, and in the Pub/Sub technology, is referred to as Topic. A second parameter of the Subscribe ( ) indicates identification information of the device which becomes the subscription destination. In addition, a CCN 101#3.adp indicates a sensor adapter application 702#3.

In addition, in a process of (2) illustrated in FIG. 7, the condition management server 202 notifies Subscribe (C2, SUS 201) to a Pub/Sub server application 701#3 of the CCN 101#3.

Next, in a process of (3) illustrated in FIG. 7, the sensor adapter application 702#1 acquires a temperature measured by the temperature sensor included in the portable terminal 102#A from the portable terminal 102#A. In the example of FIG. 7, the acquired temperature is 35° C. and is greater than 30° C. indicated in the condition information C1, and thus, the sensor adapter application 702#1 determines that the condition indicated by the condition information C1 is established. After the determination, in a process of (4) illustrated in FIG. 7, the sensor adapter application 702#1 notifies Publish (C1, 35) to the Pub/Sub server application 701#1 as a process which is performed when the condition information C1 is established. The Publish ( ) is a message of performing notification of Topic. A first parameter of the Publish ( ) indicates Topic to be notified. A second parameter of the Publish ( ) indicates information which becomes the contents of the Topic.

In a process of (5) illustrated in FIG. 7, the Pub/Sub server application 701#1 which has received the Publish (C1, 35) notifies the Publish (C1, 35) to the sensor adapter application 702#3.

Then, in a process of (6) illustrated in FIG. 7, the sensor adapter application 702#3 which has received the Publish (C1, 35) acquires a temperature measured by the temperature sensor included in the portable terminal 102#B from the portable terminal 102#B. In the example of FIG. 7, the establishment of the condition indicated by the condition information C1 is received from the CCN 101#1, and the acquired temperature is 20° C. and is lower than 25° C., and thus, the sensor adapter application 702#3 determines that the condition indicated by the condition information C2 is established. After the determination, in a process of (7) illustrated in FIG. 7, the sensor adapter application 702#3 notifies Publish (C2, 20) to the Pub/Sub server application 701#3 as a process which is performed when the condition information C2 is established.

In a process of (8) illustrated in FIG. 7, the Pub/Sub server application 701#3 which has received the Publish (C2, 20) notifies the Publish (C2, 20) to the SUS 201. Hereinafter, an example will be described in which the distributed control system 100 is realized by using the Pub/Sub technology.

(Function Configuration Example of CCN 101)

Figure 8:
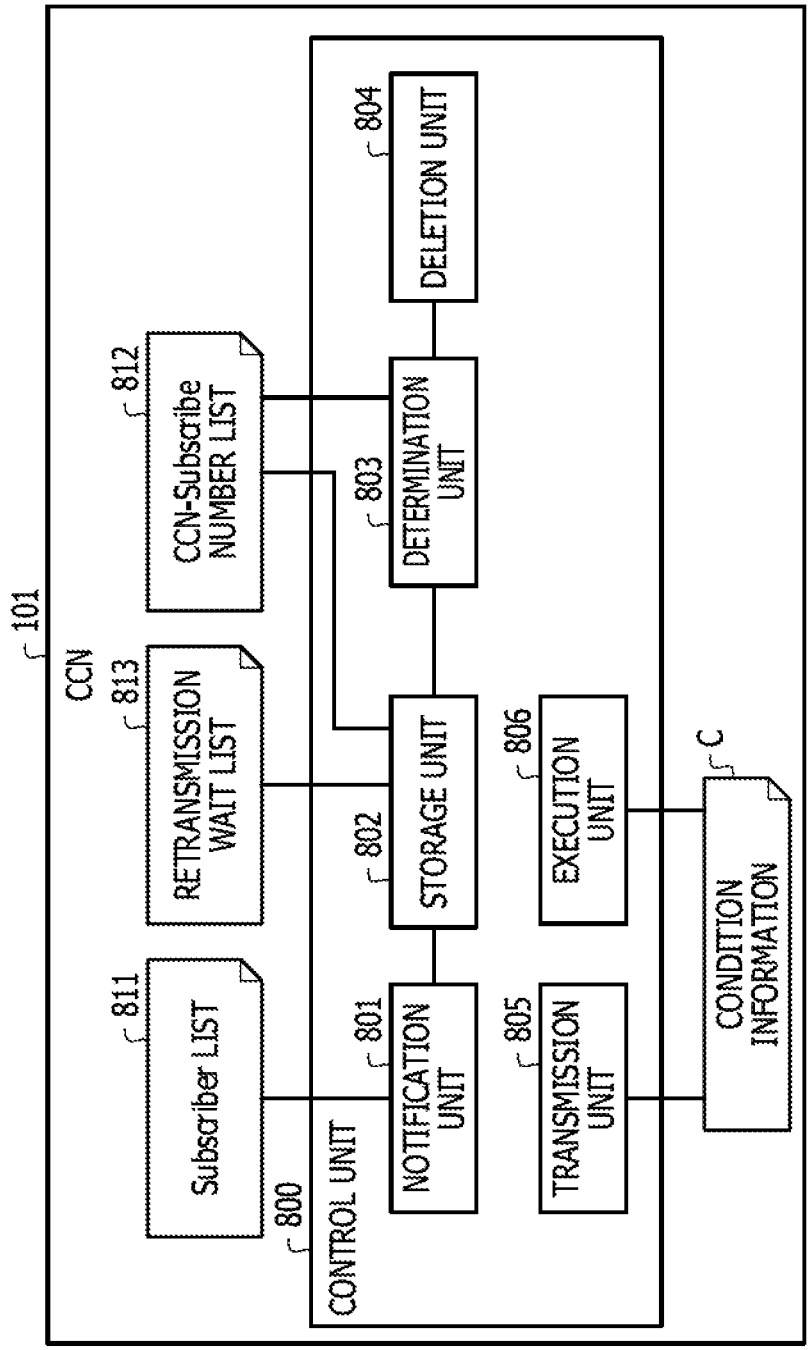
FIG. 8 is an explanatory diagram illustrating a function configuration example of a CCN.

FIG. 8 is an explanatory diagram illustrating a function configuration example of the CCN 101. The CCN 101 includes a control unit 800. The control unit 800 includes a notification unit 801, a storage unit 802, a determination unit 803, a deletion unit 804, a transmission unit 805, and an execution unit 806. The CPU 301 executes a program stored in a storage device, and thus, the control unit 800 realizes a function of each unit. Specifically, the storage device, for example, is the ROM 302, the RAM 303, the disk 305, and the like which are illustrated in FIG. 3. In addition, a process result of each unit is stored in a register of the CPU 301, a cache memory of the CPU 301, or the like.

In addition, the CCN 101 is able to access condition information C, a Subscriber list 811, a CCN-Subscribe number list 812, and a retransmission wait list 813. The condition information C, the Subscriber list 811, the CCN-Subscribe number list 812, and the retransmission wait list 813 are stored in the storage device such as the RAM 303 and the disk 305. Here, the Subscriber list 811 corresponds to the notification destination information 111 illustrated in FIG. 1. In addition, the retransmission wait list 813 corresponds to the negative acknowledgement information 112 illustrated in FIG. 1.

The notification unit 801 to the deletion unit 804 are functions of the CCN 101#1 illustrated in FIG. 1. In the description of the notification unit 801 to the deletion unit 804, by using the example of FIG. 7, the portable terminal 102 detecting first Topic is set to the portable terminal 102#A, and the portable terminal 102 detecting second Topic is set to the portable terminal 102#B. Then, the portable terminal 102#B is moved to the position under the CCN 101#5 from the position under the CCN 101#3.

In a case where the detection of the first Topic is received, the notification unit 801 notifies the Publish of the first Topic to the CCN 101#3 by referring to the Subscriber list 811.

In a case where nack to the fact that a process according to the Publish of the first Topic is not able to be executed is received from the CCN 101#3, the storage unit 802 associates identification information of the first Topic and identification information of the CCN 101#3 with each other and stores the identification information in the retransmission wait list 813.

The determination unit 803 determines whether or not the identification information of the first Topic is included in the retransmission wait list 813 according to the fact that Subscribe of the detection of the first Topic is received from the CCN 101#5.

In a case where it is determined that the identification information of the first Topic is included in the retransmission wait list 813, the deletion unit 804 deletes the identification information of the CCN 101#3 associated with the identification information of the first Topic from the Subscriber list 811 and the retransmission wait list 813.

Next, a function in a case where the Subscribe is notified after the Publish will be described. The CCN 101#1 receives the Subscribe of the first Topic from the CCN 101#5 after receiving the nack. The determination unit 803 determines whether or not the number of identification information items of the CCN 101 associated with the identification information of the first Topic included in the retransmission wait list 813 is coincident with the number of CCNs 101 which have transmitted the Subscribe according to the fact that the Subscribe is received. The number of CCNs 101 Subscribe of each Topic is transmitted is stored in the CCN-Subscribe number list 812.

Then, in a case where it is determined that the two numbers relevant to the first Topic are coincident with each other, the deletion unit 804 deletes the identification information of the CCN 101#3 associated with the identification information of the first Topic from the Subscriber list 811 and the retransmission wait list 813.

A case where the Subscribe is notified after the Publish will be described in more detail with reference to FIG. 12 to FIG. 16. Next, a function in a case where the Subscribe is notified before the Publish will be described.

In a case where the detection of the first Topic is received before the nack is received and after the Subscribe is received from the CCN 101#5, the notification unit 801 notifies the Publish of the first Topic to the CCN 101#5 in addition to the CCN 101#3.

In addition, the determination unit 803 determines whether or not the number of identification information items of the CCN 101 associated with the identification information of the first Topic included in the retransmission wait list 813 is coincident with the number of notification devices which have transmitted the Subscribe according to the fact that the nack is received.

Then, in a case where it is determined that the two numbers relevant to the first Topic are coincident with each other, the deletion unit 804 deletes the identification information of the CCN 101#3 associated with the identification information of the first Topic from the Subscriber list 811 and the retransmission wait list 813.

A case where the Subscribe is notified before the Publish will be described in more detail with reference to FIG. 17 and FIG. 18. Next, a function in a case of exceeding the time limit based on a time at which the nack is received will be described.

In a case where the nack is received, the storage unit 802 associates the identification information of the first Topic, the identification information of the CCN 101#3, and a value indicating the time limit based on a time at which the nack is received with each other, and stores the information in the retransmission wait list 813. Hereinafter, the time limit will be referred to as "Expire time".

Then, the determination unit 803 determines whether or not the number of identification information items of the notification device associated with the identification information of the first Topic included in the retransmission wait list 813 is coincident with the number of notification devices which have transmitted the request according to the fact that the current time becomes the time limit.

Next, in a case where it is determined that the two numbers relevant to the first Topic are coincident with each other, the deletion unit 804 deletes the identification information of the CCN 101#3 associated with the identification information of the first Topic from the Subscriber list 811 and the retransmission wait list 813.

A case of exceeding the Expire time will be described in more detail with reference to FIG. 19 to FIG. 21. Next, the transmission unit 805 and the execution unit 806 will be described. The transmission unit 805 and the execution unit 806 are functions of the CCNs 101#2 and 101#3 illustrated in FIG. 1. First, the function of the CCN 101#2 illustrated in FIG. 1 will be described.

In a case where the Publish of the first Topic different from the second Topic is received from the CCN 101#1, the transmission unit 805 transmits a transmission request of the presence or absence of the detection of the second Topic to the portable terminal 102#B by referring to the condition information C. Here, the condition information C is information indicating a predetermined process when the detection of another Topic is received from the another CCN 101 and a condition indicating that any Topic is detected is satisfied. The predetermined process may be any process, and for example, may be a process which is notified to the SUS 201, or may be a process which notifies the Publish to the another CCN 101.

Then, in a case where there is no response with respect to the transmission request, the transmission unit 805 transmits a negative acknowledgement to the fact that a process corresponding to the detection of the another Topic is not able to be executed to the CCN 101#1.

Next, the function of the CCN 101#3 illustrated in FIG. 1 will be described. In a case where the condition information C is received by being connected to the portable terminal 102#B which stores the condition information C and detects the second Topic, the transmission unit 805 transmits the Subscribe of the first Topic to the CCN 101#1. Then, in a case where the Publish of the first Topic is received from the CCN 101#1, the transmission unit 805 transmits the transmission request of the presence or absence of the detection of the second Topic to the portable terminal 102#B detecting the second Topic by referring to the condition information C.

In a case where the detection of the second Topic is received from the portable terminal 102#B detecting the second Topic, the execution unit 806 executes a predetermined process by referring to the condition information C.

Figure 9:
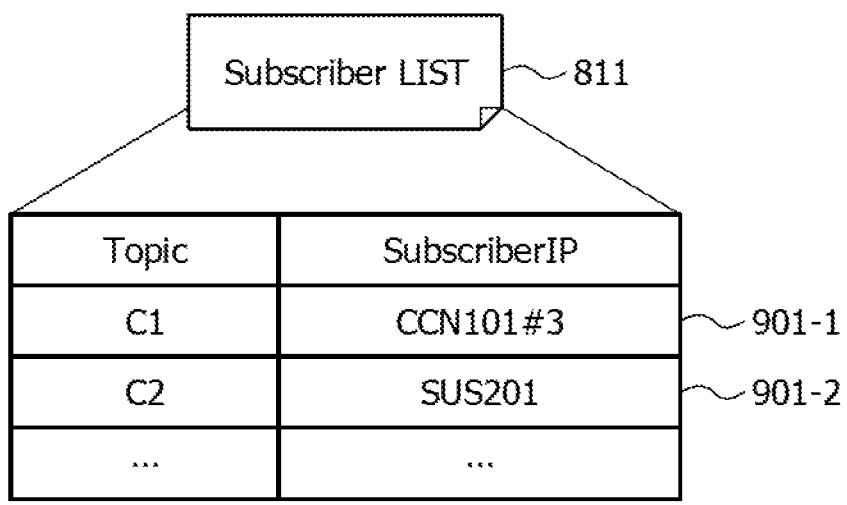
FIG. 9 is an explanatory diagram illustrating an example of stored contents of a Subscriber list.

FIG. 9 is an explanatory diagram illustrating an example of the stored contents of the Subscriber list 811. The Subscriber list 811 illustrated in FIG. 9 includes entries 901-1 and 901-2.

The Subscriber list 811 includes a field such as Topic and SubscriberIP. A Topic field stores identification information of information to which a device indicated by the SubscriberIP subscribes. A SubscriberIP field stores an IP address of the device indicated by the SubscriberIP. In the example of FIG. 9, for the sake of simple description, the SubscriberIP field stores a character string to which a reference numeral is applied to the name of a device. Furthermore, the SubscriberIP field may exist in a list different from the Subscriber list 811, but is the same.

For example, in a case where the condition indicated by the condition information C1 is established, the entry 901-1 indicates that information indicating the establishment of the condition indicated by the condition information C1 is transmitted to the CCN 101#3.

Figure 10:
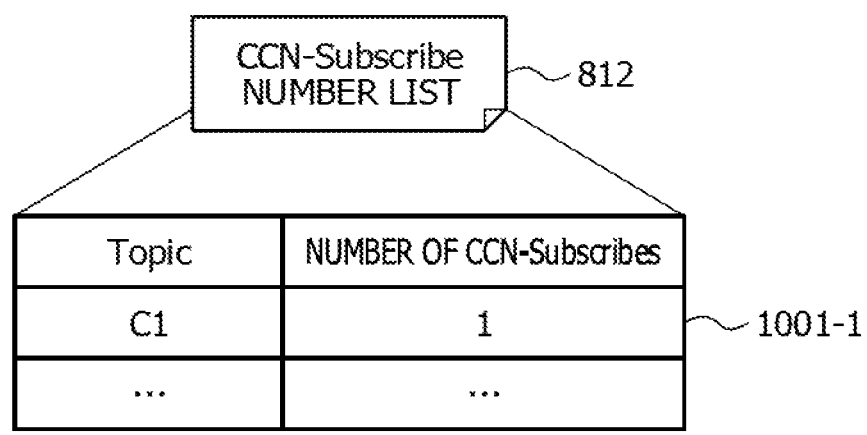
FIG. 10 is an explanatory diagram illustrating an example of stored contents of a CCN-Subscribe number list.

FIG. 10 is an explanatory diagram illustrating an example of the stored contents of the CCN-Subscribe number list 812. The CCN-Subscribe number list 812 illustrated in FIG. 10 includes an entry 1001-1.

The CCN-Subscribe number list 812 includes a field such as Topic and CCN-Subscribe number. A Topic field stores identification information of information to which any device subscribes. A CCN-Subscribe number field stores the number of devices performing the subscription with respect to the information stored in the Topic field.

For example, the entry 1001-1 indicates that there is one device which becomes a subscription destination of the information indicating the establishment of the condition indicated by the condition information C1.

Figure 11:
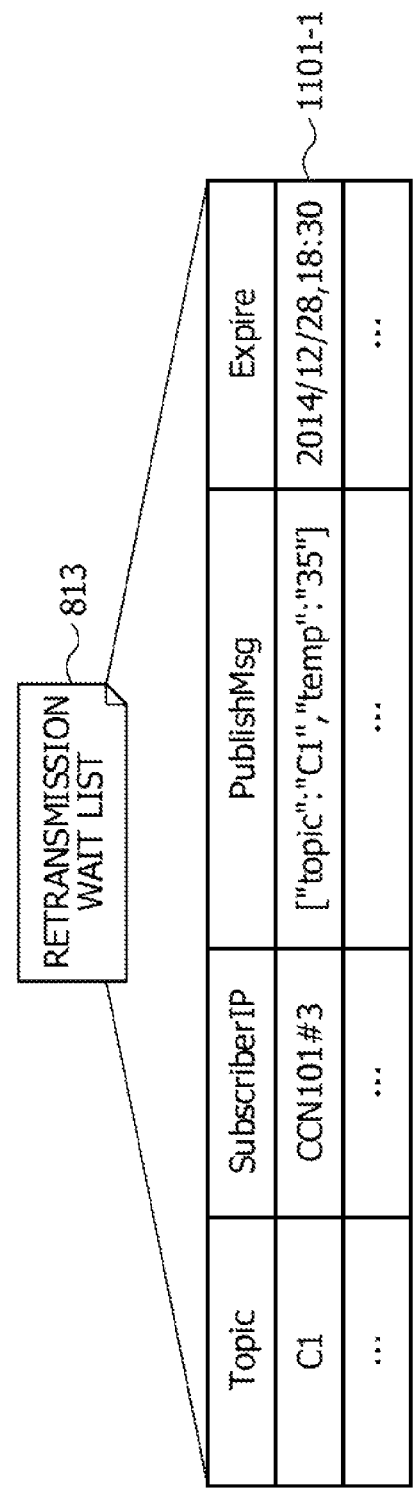
FIG. 11 is an explanatory diagram illustrating an example of stored contents of a retransmission wait list.

FIG. 11 is an explanatory diagram illustrating an example of the stored contents of the retransmission wait list 813. The retransmission wait list 813 illustrated in FIG. 11 includes an entry 1101-1.

The retransmission wait list 813 includes a field such as Topic, SubscriberIP, PublishMsg, and Expire. A Topic field stores identification information of information to which any device subscribes. A SubscriberIP field stores an IP address of the device which performs the subscription with respect to the information stored in the Topic field. A PublishMsg field stores the contents of the message which is retransmitted. An Expire field stores a time at which the retransmission of the message terminates.

For example, the entry 1101-1 indicates that a transmission destination retransmits a message such as CCN 101#3 ["topic":"C1","temp":"35"] till 18:30 on Dec. 28, 2014.

Next, three examples of suppressing the retransmission of the Publish which occurs when the portable terminal 102 is moved will be described with reference to FIG. 12 to FIG. 16, FIG. 17 and FIG. 18, and FIG. 19 to FIG. 21, respectively. Here, in a case where the portable terminal 102 is moved, the portable terminal 102 is merely registered in another CCN 101, and the total number of portable terminals 102 registered in the entire distributed control system 100 is not changed. By using such characteristics, in a case where the number of retransmission waits due to the nack is coincident with the number of newly arrived Subscribes, the distributed control system 100 deletes the retransmission wait due to the nack, and thus, suppresses the retransmission of the Publish.

(Case where Subscribe is Notified after Publish)

Next, an example of suppressing the retransmission of the Publish which occurs due to the movement of the portable terminal 102 in a case where the Subscribe is notified after the Publish will be described by using FIG. 12 to FIG. 16.

Figure 12:
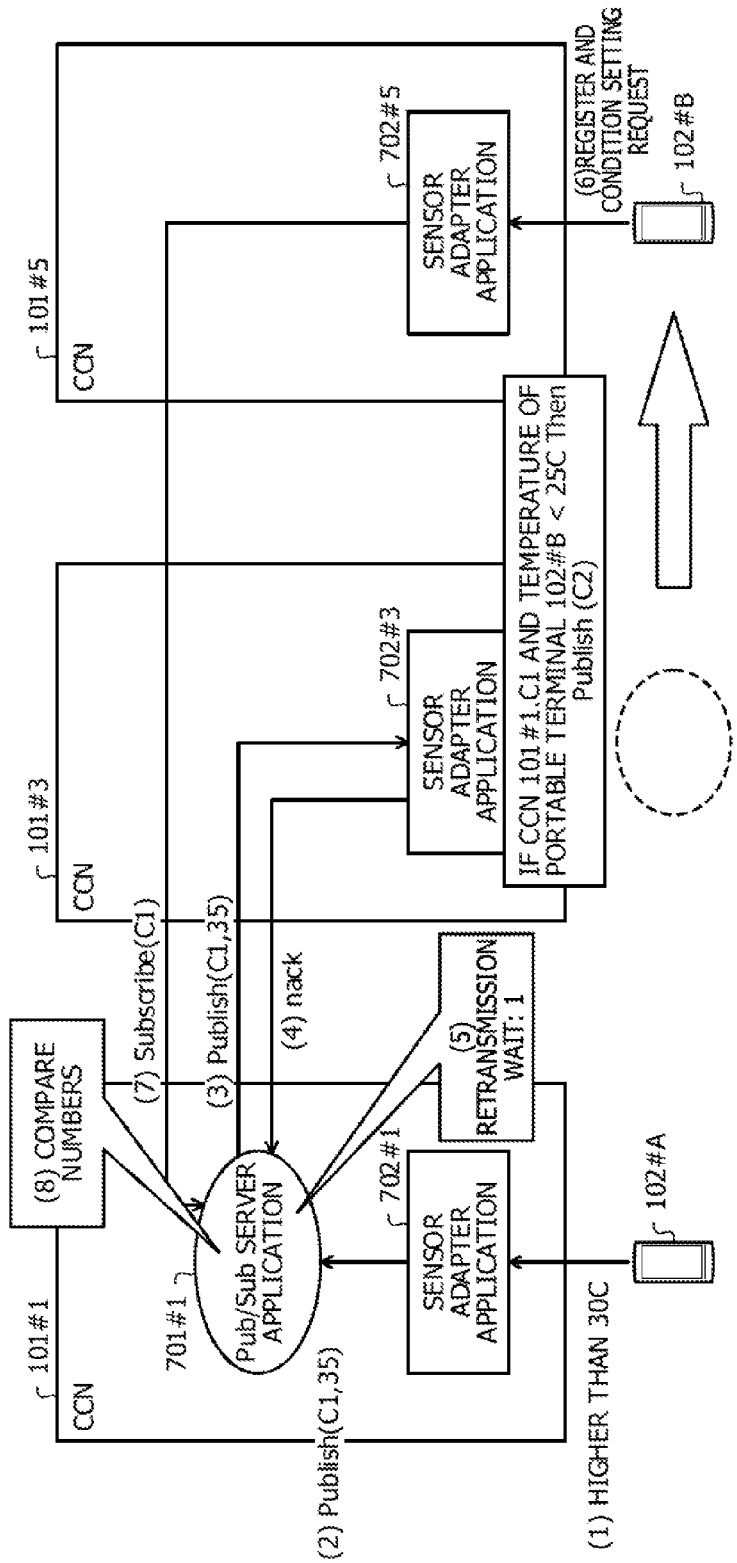
FIG. 12 is an explanatory diagram illustrating a message transmission example in a case where Subscribe is notified after Publish.

FIG. 12 is an explanatory diagram illustrating a message transmission example in a case where the Subscribe is notified after the Publish. In a state illustrated in FIG. 12, the portable terminal 102#B is moved to the position under the CCN 101#5 from the position under the CCN 101#3. At this time, Subscribe according to a process of (7) illustrated in FIG. 12, which occurs due to the movement of the portable terminal 102 is notified after Publish according to a process of (3) illustrated in FIG. 12.

In a process of (1) illustrated in FIG. 12, the sensor adapter application 702#1 acquires temperature measured by the temperature sensor included in the portable terminal 102#A from the portable terminal 102#A. In the example of FIG. 12, the acquired temperature is 35° C. and is higher than 30° C. indicated in the condition information C1, and thus, the sensor adapter application 702#1 determines that the condition indicated by the condition information C1 is established. After the determination, in a process of (2) illustrated in FIG. 12, the sensor adapter application 702#1 notifies the Publish (C1, 35) to the Pub/Sub server application 701#1 as a process which is performed when the condition information C1 is established.

Figure 14:
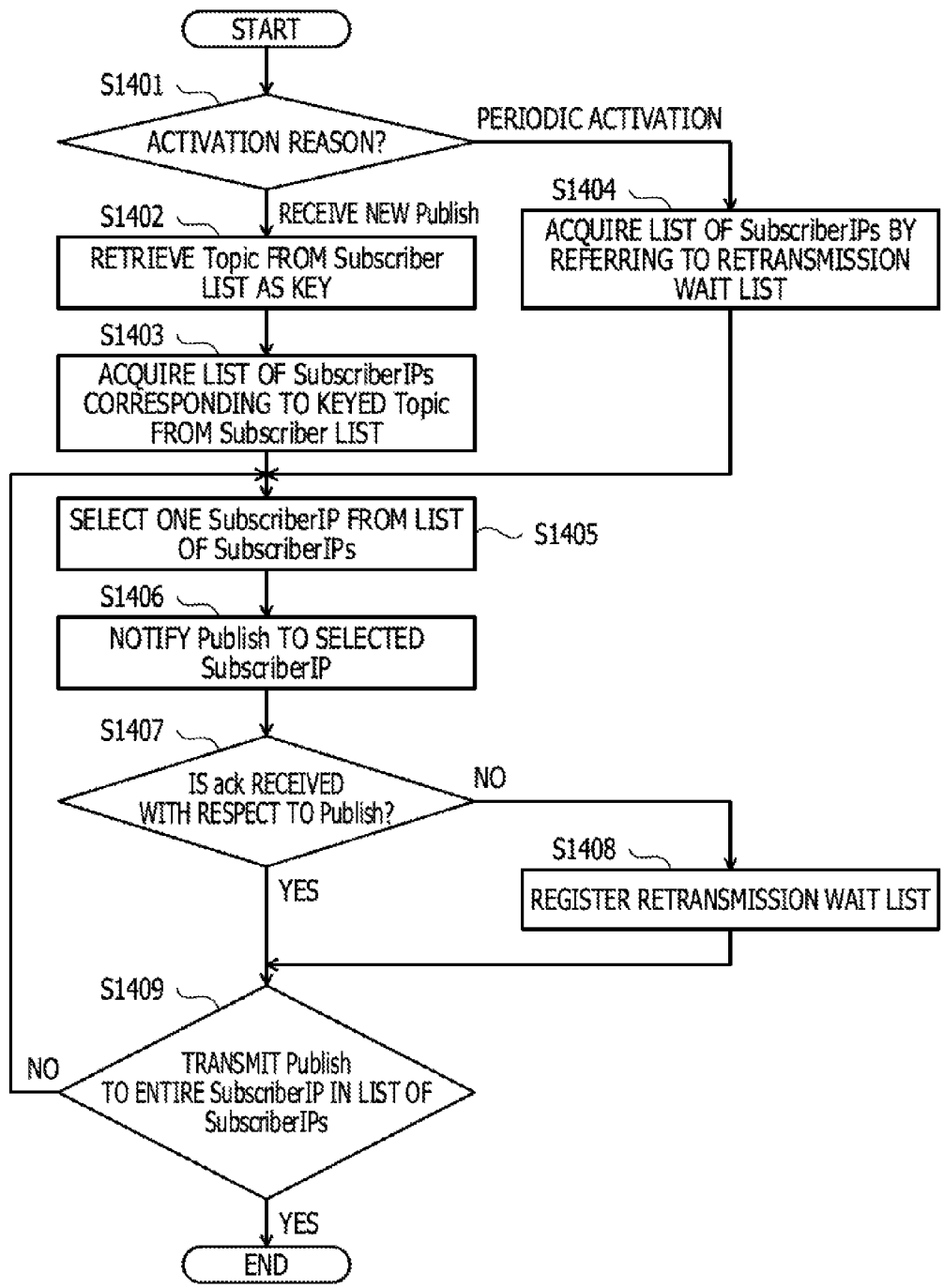
FIG. 14 is a flowchart illustrating an example of a procedure of a first Publish process.

The Pub/Sub server application 701#1 which has received the Publish (C1, 35) executes a first Publish process. The first Publish process is illustrated in FIG. 14. Then, in the process of (3) illustrated in FIG. 12, the Pub/Sub server application 701#1 notifies the Publish (C1, 35) to the sensor adapter application 702#3 as a part of the first Publish process.

The sensor adapter application 702#3 which has received the Publish (C1, 35) tries to access the temperature sensor included in the portable terminal 102#B. However, the portable terminal 102#B is moved, and the sensor adapter application 702#3 is not able to access the temperature sensor included in the portable terminal 102#B. The sensor adapter application 702#3 performs retry predesignated number of times, and then, in a process of (4) illustrated in FIG. 12, notifies the nack to the Pub/Sub server application 701#1.

In a process of (5) illustrated in FIG. 12, the Pub/Sub server application 701#1 which has received the nack increases the number of retransmission waits by one as a part of the first Publish process. Specifically, the Pub/Sub server application 701#1 registers a retransmission message to the retransmission wait list 813.

Figure 15:
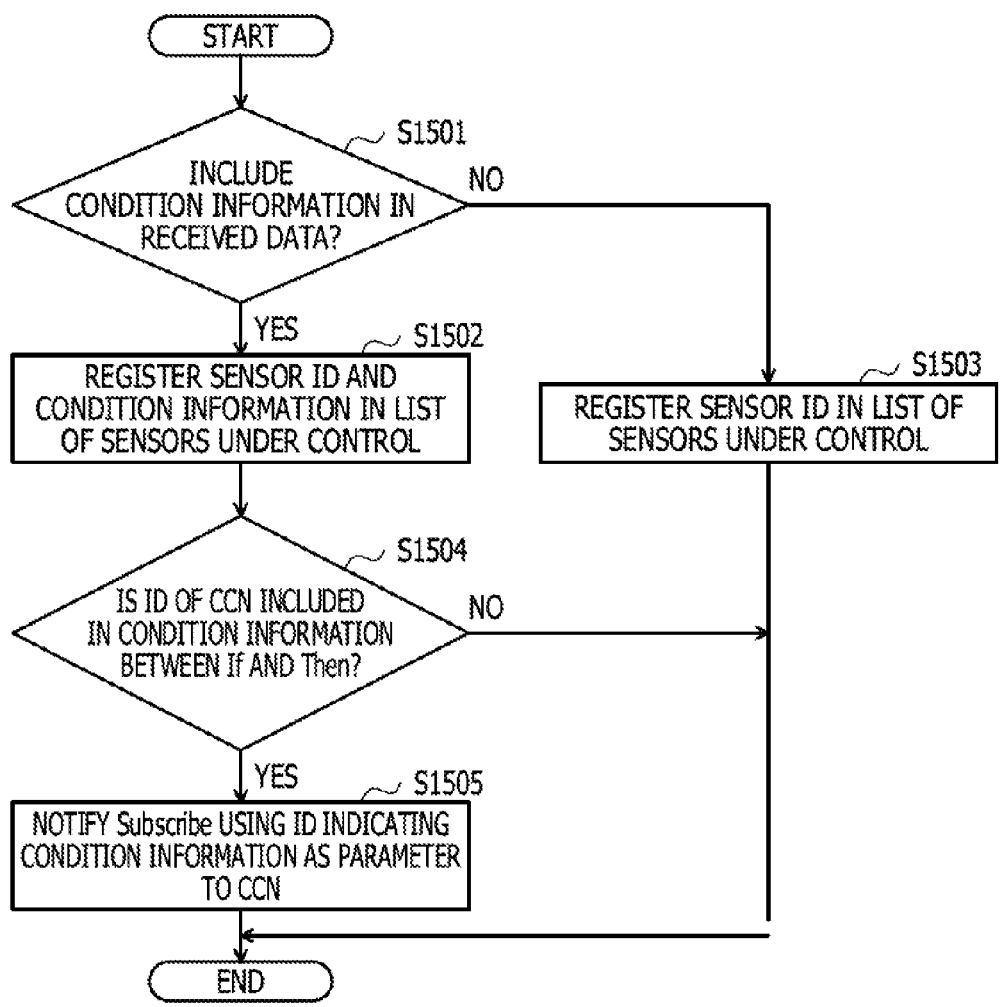
FIG. 15 is a flowchart illustrating an example of a procedure of a Register and condition setting request receiving process.

Then, in a process of (6) illustrated in FIG. 12 after the process of (3) illustrated in FIG. 12, the sensor adapter application 702#5 which has received the Register and the condition setting request from the portable terminal 102#B executes the Register and a condition setting request receiving process. The Register and the condition setting request receiving process are illustrated in FIG. 15. Then, in the process of (7) illustrated in FIG. 12, the sensor adapter application 702#5 notifies Subscribe (C1) to the Pub/Sub server application 701#1 as a part of the Register and the condition setting request receiving process.

Figure 16:
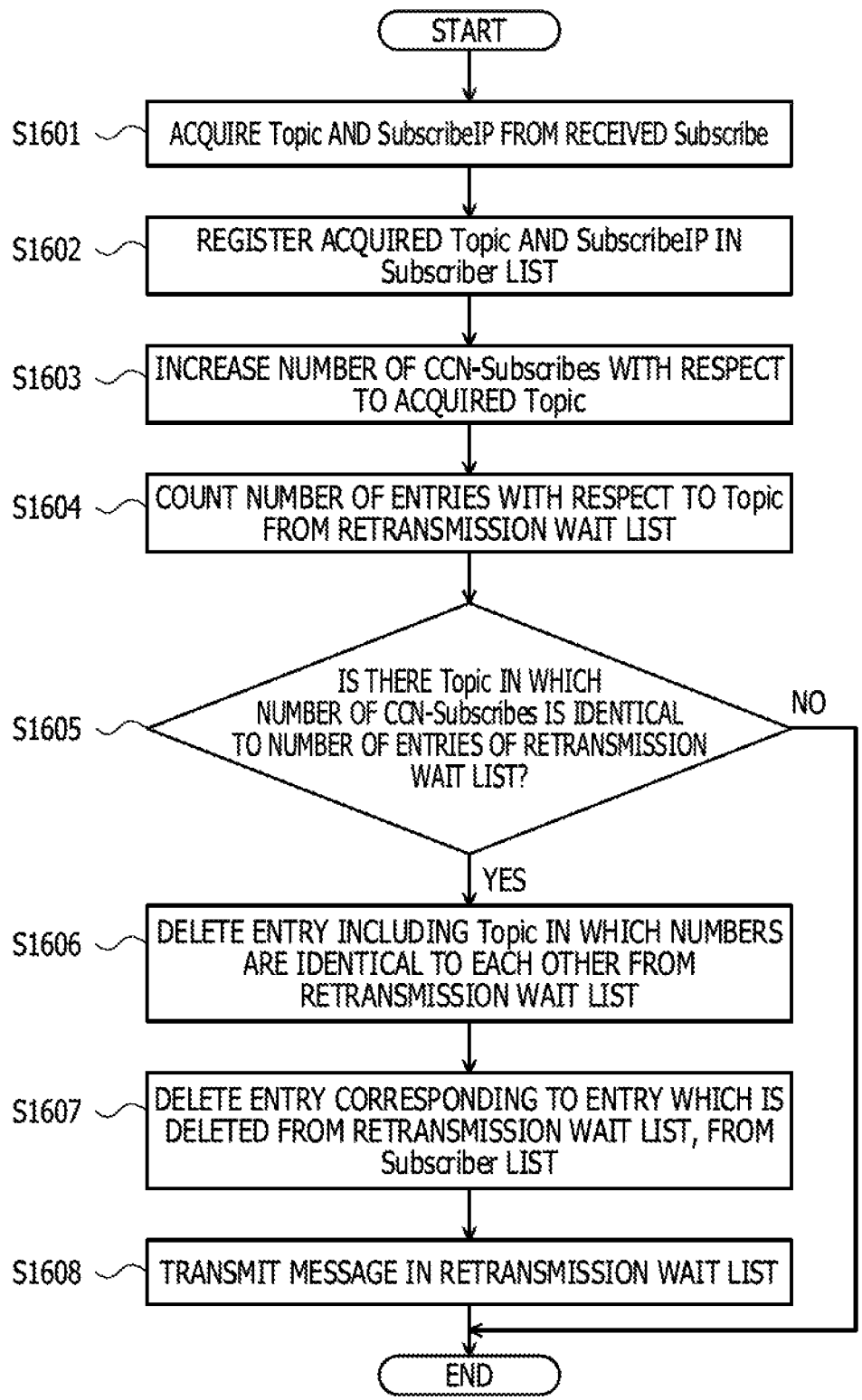
FIG. 16 is a flowchart illustrating an example of a procedure of a process at the time of receiving Subscribe from the CCN.

The Pub/Sub server application 701#1 which has received the Subscribe (C1) executes a process at the time of receiving Subscribe from the CCN 101. The process at the time of receiving Subscribe from the CCN 101 is illustrated in FIG. 16. Then, the Pub/Sub server application 701#1 compares the number of retransmission waits due to the nack with the number of newly arrived Subscribes according to a process of (8) illustrated in FIG. 12 as a part of the process at the time of receiving Subscribe from the CCN 101. In the example of FIG. 12, the number of retransmission waits due to the nack is one, and the number of newly arrived Subscribes is one, and thus, the two numbers are coincident with each other. Accordingly, in this case, the Pub/Sub server application 701#1 deletes the retransmission wait due to the nack.

Next, a flowchart illustrating a process performed by the distributed control system 100 will be described by using FIG. 13 to FIG. 16.

Figure 13:
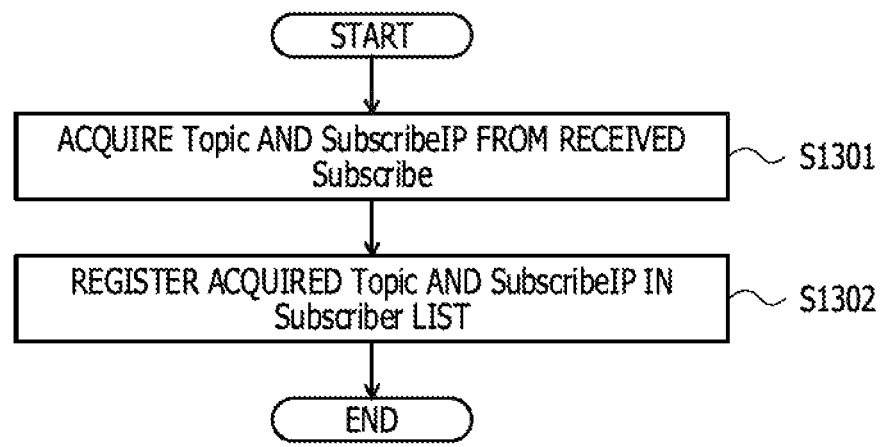
FIG. 13 is a flowchart illustrating an example of a procedure of a process at the time of receiving Subscribe from an SUS.

FIG. 13 is a flowchart illustrating an example of a procedure of the process at the time of receiving Subscribe from the SUS 201. The process at the time of receiving Subscribe from the SUS 201 is a process which is performed by the Pub/Sub server application 701 at the time of receiving the Subscribe from the SUS 201. For example, the process at the time of receiving Subscribe from the SUS 201 is executed by the Pub/Sub server application 701 after the process of (1) or (2) illustrated in FIG. 7.

The Pub/Sub server application 701 acquires Topic and SubscribeIP from the Subscribe which has been received from the SUS 201 (Step S1301). Then, the Pub/Sub server application 701 registers the acquired Topic and SubscribeIP in the Subscriber list 811 (Step S1302). After the process of Step S1302 ends, the Pub/Sub server application 701 ends the process at the time of receiving Subscribe from the SUS 201. By executing the process at the time of receiving Subscribe from the SUS 201, the Pub/Sub server application 701 is able to perform management by associating information which becomes a subscription target with a device performing subscription with respect to the subscription target.

FIG. 14 is a flowchart illustrating an example of a procedure of the first Publish process. The first Publish process is a process which is performed by the Pub/Sub server application 701, and is a process of transmitting Publish.

The Pub/Sub server application 701 confirms the activation reason of the Publish process (Step S1401). In a case where the Publish process is activated by receiving new Publish (Step S1401: Receive New Publish), the Pub/Sub server application 701 retrieves the Topic from the Subscriber list 811 as a key (Step S1402). Then, the Pub/Sub server application 701 acquires a list of the SubscriberIPs corresponding to the keyed Topic from the Subscriber list 811 (Step S1403).

On the other hand, in a case where the Publish process is activated by periodic activation for retransmission (Step S1401: Periodic Activation), the Pub/Sub server application 701 acquires the list of the SubscriberIPs by referring to the retransmission wait list 813 (Step S1404).

After any one process of Step S1403 and Step S1404 ends, the Pub/Sub server application 701 selects one SubscriberIP from the list of the SubscriberIPs (Step S1405). Then, the Pub/Sub server application 701 notifies the Publish to the selected SubscriberIP (Step S1406). Then, the Pub/Sub server application 701 determines whether or not ack with respect to the Publish is received (Step S1407). In a case where nack with respect to the Publish is received (Step S1407: No), the Pub/Sub server application 701 registers the Publish in the retransmission wait list 813 (Step S1408).

In a case where the ack with respect to the Publish is received (Step S1407: Yes), the Pub/Sub server application 701 determines whether or not the Publish is transmitted to the entire SubscriberIP in the list of the SubscriberIPs (Step S1409). In a case where there is SubscriberIP which has transmitted the Publish in the list of the SubscriberIPs (Step S1409: No), the Pub/Sub server application 701 proceeds to a process of Step S1405. In contrast, in a case where the Publish is transmitted to the entire SubscriberIP in the list of the SubscriberIPs (Step S1409: Yes), the Pub/Sub server application 701 ends the first Publish process.

By executing the first Publish process, the Pub/Sub server application 701 is able to notify information indicated by the Topic to the Subscriber registered in the Topic.

FIG. 15 is a flowchart illustrating an example of a procedure of the Register and a condition setting request receiving process. The Register and the condition setting request receiving process are processes performed at the time of receiving the Register and the condition setting request from the portable terminal 102.

In a case where the Register and the condition setting request are received from the portable terminal 102, the sensor adapter application 702 determines whether or not the condition information is included in the received data (Step S1501). In a case where the condition information is included (Step S1501: Yes), the sensor adapter application 702 registers a sensor ID and the condition information in a list of sensors under control (Step S1502). Here, the list of sensors under control is a list stored by the CCN 101, and is a list of managing sensors in a region under control. Then, the sensor adapter application 702 determines whether or not ID of CCN is included between If and Then of the condition information (Step S1504). In a case where the ID of the CCN is included between If and Then of the condition information (Step S1504: Yes), the sensor adapter application 702 notifies Subscribe using the ID indicating the condition information as a parameter to the CCN of which the ID is included between If and Then of the condition information (Step S1505).

In contrast, in a case where the condition information is not included (Step S1501: No), the sensor adapter application 702 registers the sensor ID in the list of sensors under control (Step S1503). After the process of Step S1503 or Step S1505 ends, or in a case where the ID of CCN is not included between If and Then of the condition information (Step S1504: No), the sensor adapter application 702 ends the Register and the condition setting request receiving process. By executing the Register and the condition setting request receiving process, in a case where the portable terminal 102 which has been moved includes the condition information, the sensor adapter application 702 is able to notify the Subscribe to a device including an establishment condition of a part of a condition indicated by the condition information.

FIG. 16 is a flowchart illustrating an example of a procedure of the process at the time of receiving Subscribe from the CCN 101. The process at the time of receiving Subscribe from the CCN 101 is a process which is performed by the Pub/Sub server application 701 at the time of receiving the Subscribe from the another CCN 101.

The Pub/Sub server application 701 acquires Topic and SubscribeIP from the received Subscribe (Step S1601). Next, the Pub/Sub server application 701 registers the acquired Topic and SubscribeIP in the Subscriber list 811 (Step S1602). Then, the Pub/Sub server application 701 increases the number of CCN-Subscribes with respect to the acquired Topic (Step S1603). Next, the Pub/Sub server application 701 counts the number of entries with respect to the Topic from the retransmission wait list 813 (Step S1604).

Then, the Pub/Sub server application 701 determines whether or not there is Topic in which the number of CCN-Subscribes is identical to the number of entries of the retransmission wait list 813 (Step S1605). In a case where there is Topic in which the number of CCN-Subscribes is identical to the number of entries of the retransmission wait list 813 (Step S1605: Yes), the Pub/Sub server application 701 deletes an entry including the Topic in which the numbers are identical to each other from the retransmission wait list 813 (Step S1606). In addition, the Pub/Sub server application 701 deletes an entry corresponding to the entry which is deleted from the retransmission wait list 813, from the Subscriber list 811 (Step S1607). Then, the Pub/Sub server application 701 transmits a message in the retransmission wait list 813 (Step S1608). Furthermore, in Step S1608, in a case where the number of entries of the retransmission wait list 813 becomes 0, the Pub/Sub server application 701 does not transmit the message.

After the process of Step S1608 ends, or in a case where there is no Topic in which the number of CCN-Subscribes is identical to the number of entries of the retransmission wait list 813 (Step S1605: No), the Pub/Sub server application 701 ends the process at the time of receiving Subscribe from the CCN 101.

By executing the process at the time of receiving Subscribe from the CCN 101, in a case where the number of CCN-Subscribes is identical to the number of entries of the retransmission wait list 813, the Pub/Sub server application 701 is able to delete the retransmission wait due to the nack.

(Case where Subscribe is Notified before Publish)

An example of suppressing the retransmission of the Publish which occurs due to the movement of the portable terminal 102 in a case where the Subscribe is notified before the Publish will be described by using FIG. 17 and FIG. 18.

Figure 17:
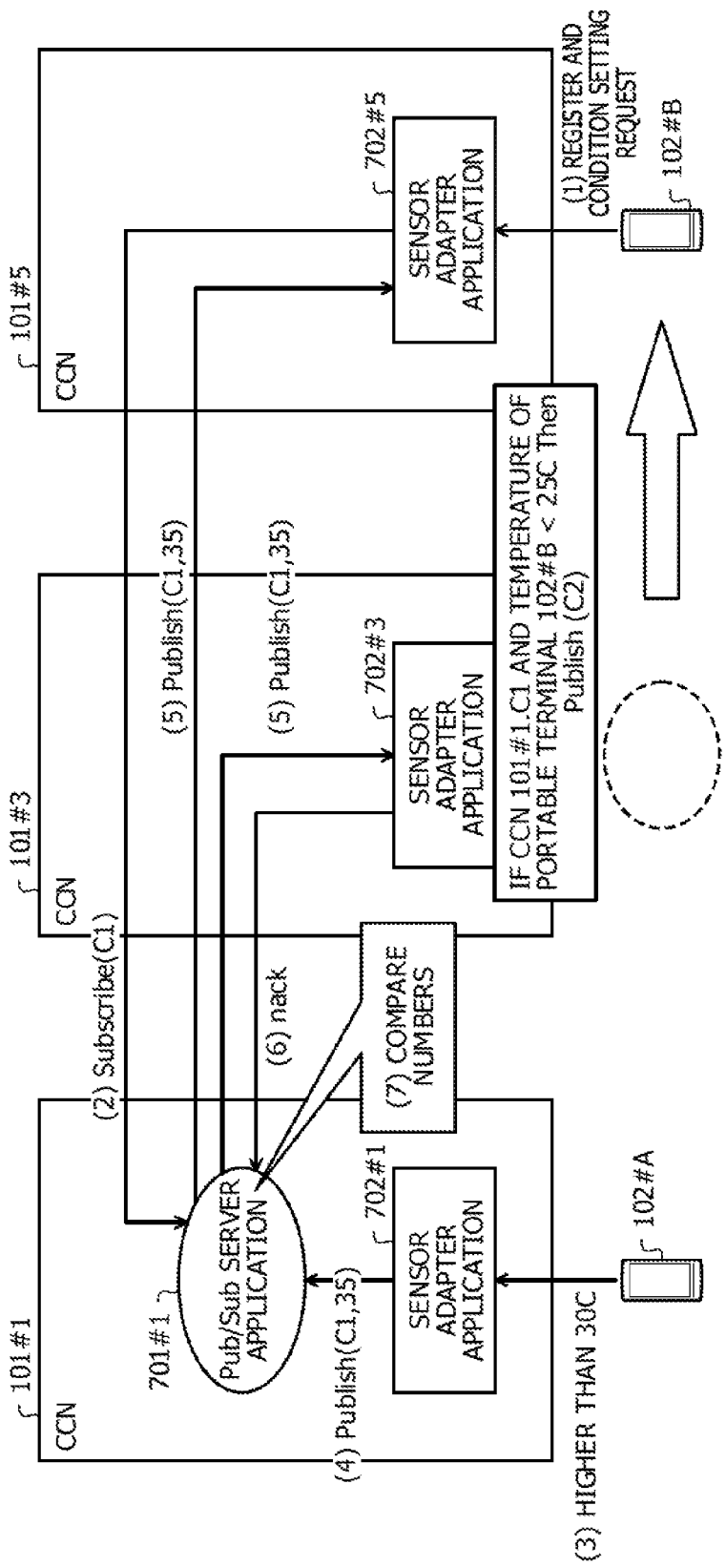
FIG. 17 is an explanatory diagram illustrating a message transmission example in a case where Subscribe is notified before Publish.

FIG. 17 is an explanatory diagram illustrating a message transmission example in a case where the Subscribe is notified before the Publish. In a state illustrated in FIG. 12, the portable terminal 102#B is moved to the position under the CCN 101#5 from the position under the CCN 101#3. At this time, the Subscribe according to a process of (2) illustrated in FIG. 17 which occurs due to the movement of the portable terminal 102 is notified before the Publish according to a process of (5) illustrated in FIG. 17.

In a process of (1) illustrated in FIG. 17, the sensor adapter application 702#5 which has received the Register and the condition setting request from the portable terminal 102#B executes the Register and the condition setting request receiving process. Then, in the process of (2) illustrated in FIG. 17, the sensor adapter application 702#5 notifies the Subscribe (C1) to the Pub/Sub server application 701#1 as a part of the Register and the condition setting request receiving process.

The Pub/Sub server application 701#1 which has received the Subscribe (C1) executes the process at the time of receiving Subscribe from the CCN 101. Next, in a process of (3) illustrated in FIG. 17, the sensor adapter application 702#1 acquires a temperature measured by the temperature sensor included in the portable terminal 102#A from the portable terminal 102#A. In the example of FIG. 17, the acquired temperature is 35° C. and is higher than 30° C. indicated in the condition information C1, and thus, the sensor adapter application 702#1 determines that the condition indicated by the condition information C1 is established. After the determination, in a process of (4) illustrated in FIG. 17, the sensor adapter application 702#1 notifies the Publish (C1, 35) to the Pub/Sub server application 701#1 as a process which is performed when the condition information C1 is established.

The Pub/Sub server application 701#1 which has received the Publish (C1, 35) executes a second Publish process. The second Publish process is illustrated in FIG. 18. Then, in the process of (5) illustrated in FIG. 17, the Pub/Sub server application 701#1 notifies the Publish (C1, 35) to the sensor adapter application 702#3 and the sensor adapter application 702#5 as a part of the second Publish process.

The sensor adapter application 702#5 which has received the Publish (C1, 35) accesses the temperature sensor included in the portable terminal 102#B, and transmits ack to the Pub/Sub server application 701#1. Subsequently, the sensor adapter application 702#5 determines whether or not the condition indicated by the condition information C2 is established.

On the other hand, the sensor adapter application 702#3 which has received the Publish (C1, 35) tries to access the temperature sensor included in the portable terminal 102#B. However, the portable terminal 102#B is moved, and the sensor adapter application 702#3 is not able to access the temperature sensor included in the portable terminal 102#B. The sensor adapter application 702#3 performs retry pre-designated number of times, and then, in a process of (6) illustrated in FIG. 17, notifies nack to the Pub/Sub server application 701#1.

In a process of (7) illustrated in FIG. 17, the Pub/Sub server application 701#1 which has received the nack compares the number of retransmission wait due to the nack with the number of newly arrived Subscribes as a part of the second Publish process. In the example of FIG. 17, the number of retransmission waits due to the nack is one, and the number of newly arrived Subscribes is one, and thus the two numbers are coincident with each other. Accordingly, in this case, the Pub/Sub server application 701#1 deletes the retransmission wait due to the nack.

Next, a flowchart illustrating the second Publish process will be described by using FIG. 18. Furthermore, a flowchart illustrating the process at the time of receiving Subscribe from the CCN 101 is identical to the flowchart illustrated in FIG. 16, and thus, the description thereof will be omitted.

Figure 18:
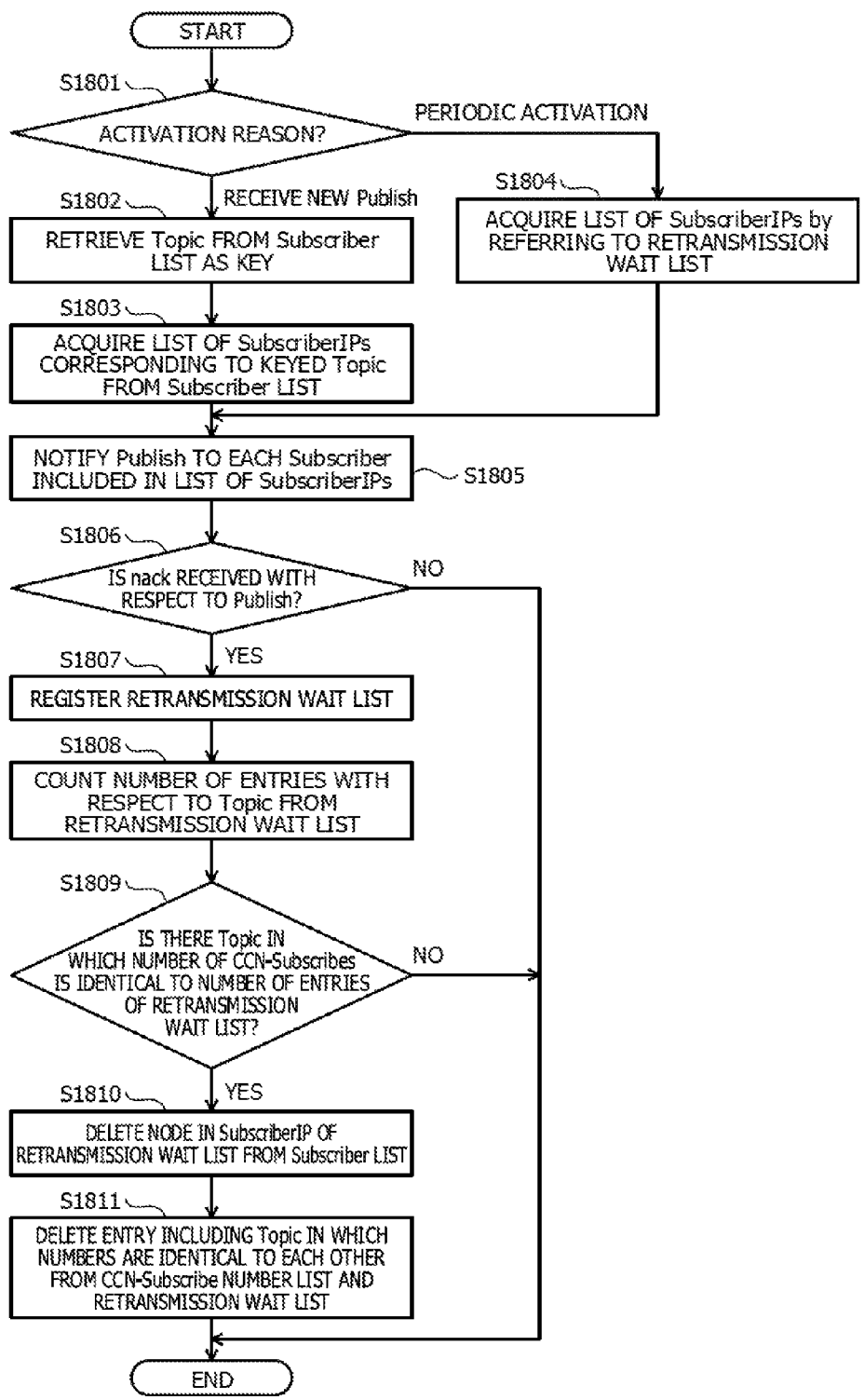
FIG. 18 is a flowchart illustrating an example of a procedure of a second Publish process.

FIG. 18 is a flowchart illustrating an example of a procedure of the second Publish process. The second Publish process is a process which is performed by the Pub/Sub server application 701, and is a process of transmitting Publish.

The Pub/Sub server application 701 confirms the activation reason of the Publish process (Step S1801). In a case where the Publish process is activated by receiving new Publish (Step S1801: Receive New Publish), the Pub/Sub server application 701 retrieves the Topic from the Subscriber list 811 as a key (Step S1802). Then, the Pub/Sub server application 701 acquires a list of the SubscriberIPs corresponding to the keyed Topic from the Subscriber list 811 (Step S1803).

On the other hand, in a case where the Publish process is activated by periodic activation for retransmission (Step S1801: Periodic Activation), the Pub/Sub server application 701 acquires the list of the SubscriberIPs by referring to the retransmission wait list 813 (Step S1804).

After any one process of Step S1803 and Step S1804 ends, the Pub/Sub server application 701 notifies the Publish to each Subscriber included in the list of the SubscriberIPs (Step S1805). Next, the Pub/Sub server application 701 determines whether or not nack with respect to the Publish is received (Step S1806). In a case where the nack with respect to the Publish is received (Step S1806: Yes), the Pub/Sub server application 701 registers the Publish with respect to the received nack in the retransmission wait list 813 (Step S1807). Then, the Pub/Sub server application 701 counts the number of entries with respect to the Topic from the retransmission wait list 813 (Step S1808).

Next, the Pub/Sub server application 701 determines whether or not there is Topic in which the number of CCN-Subscribes is identical to the number of entries of the retransmission wait list 813 (Step S1809). In a case where there is Topic in which the number of CCN-Subscribes is identical to the number of entries of the retransmission wait list 813 (Step S1809: Yes), the Pub/Sub server application 701 deletes a node in the SubscriberIP of the retransmission wait list 813 from the Subscriber list 811 (Step S1810). Then, the Pub/Sub server application 701 deletes an entry including the Topic in which the numbers are identical to each other from the CCN-Subscribe number list 812 and the retransmission wait list 813 (Step S1811). Then, the Pub/Sub server application 701 ends the second Publish process.

In addition, in a case where the nack with respect to the Publish is not received (Step S1806: No), or in a case where there is no Topic in which the number of CCN-Subscribes is identical to the number of entries of the retransmission wait list 813 (Step S1809: No), the Pub/Sub server application 701 ends the second Publish process.

By executing the second Publish process, the Pub/Sub server application 701 is able to notify information indicated by the Topic to the Subscriber registered in the Topic. Further, even in a case where the Subscribe is notified before the Publish, the Pub/Sub server application 701 is able to suppress the retransmission due to the nack in a case where the number of CCN-Subscribes is identical to the number of entries of the retransmission wait list 813.

(Case where Expire Time Arrives)

Next, an example of suppressing the retransmission of the Publish which occurs due to the movement of the portable terminal 102 in a case where the Expire time arrives will be described by using FIG. 19 to FIG. 21.

Figure 19:
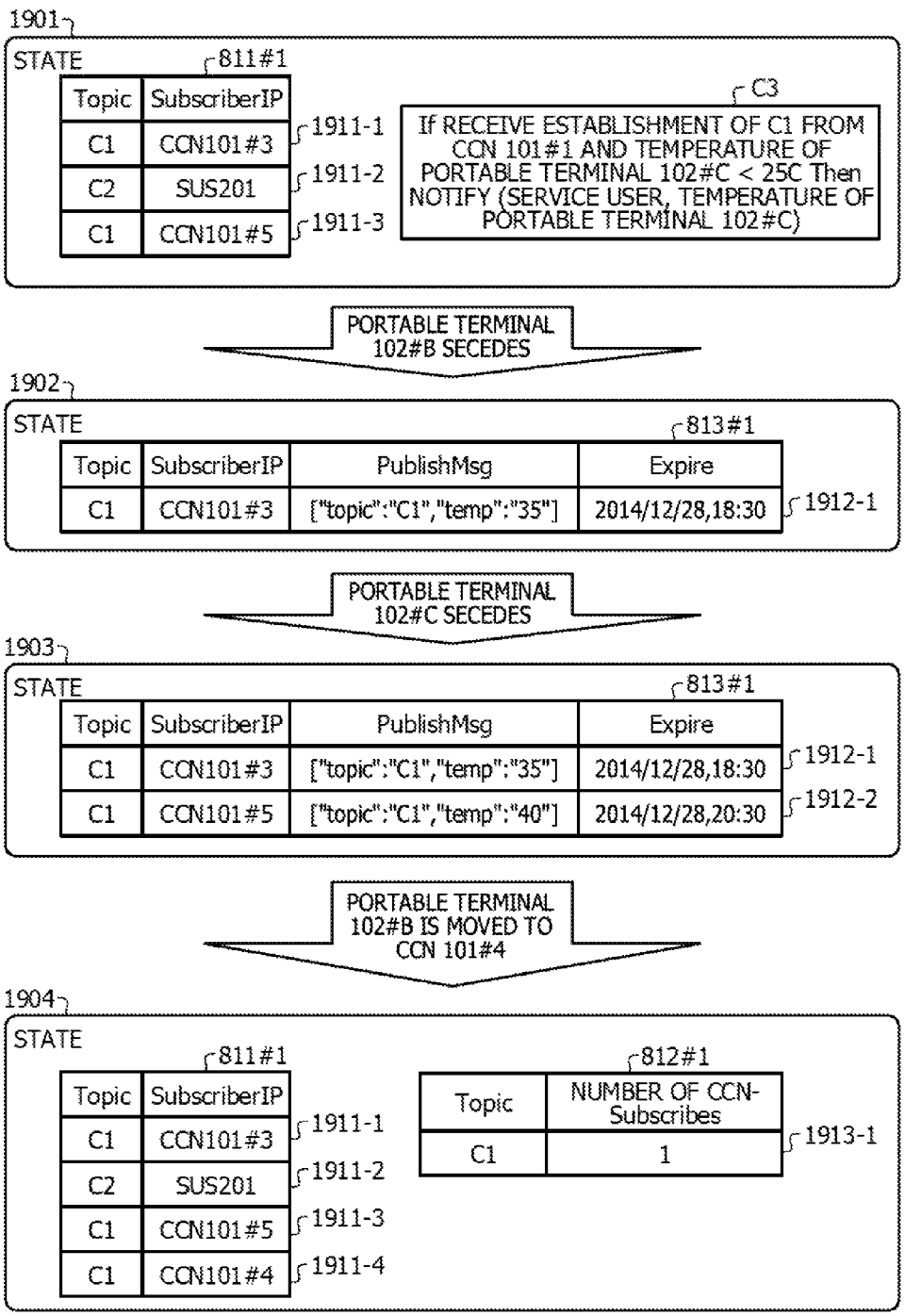
FIG. 19 is an (first) explanatory diagram illustrating an example of stored contents of each of the lists when an Expire time arrives.
Figure 20:
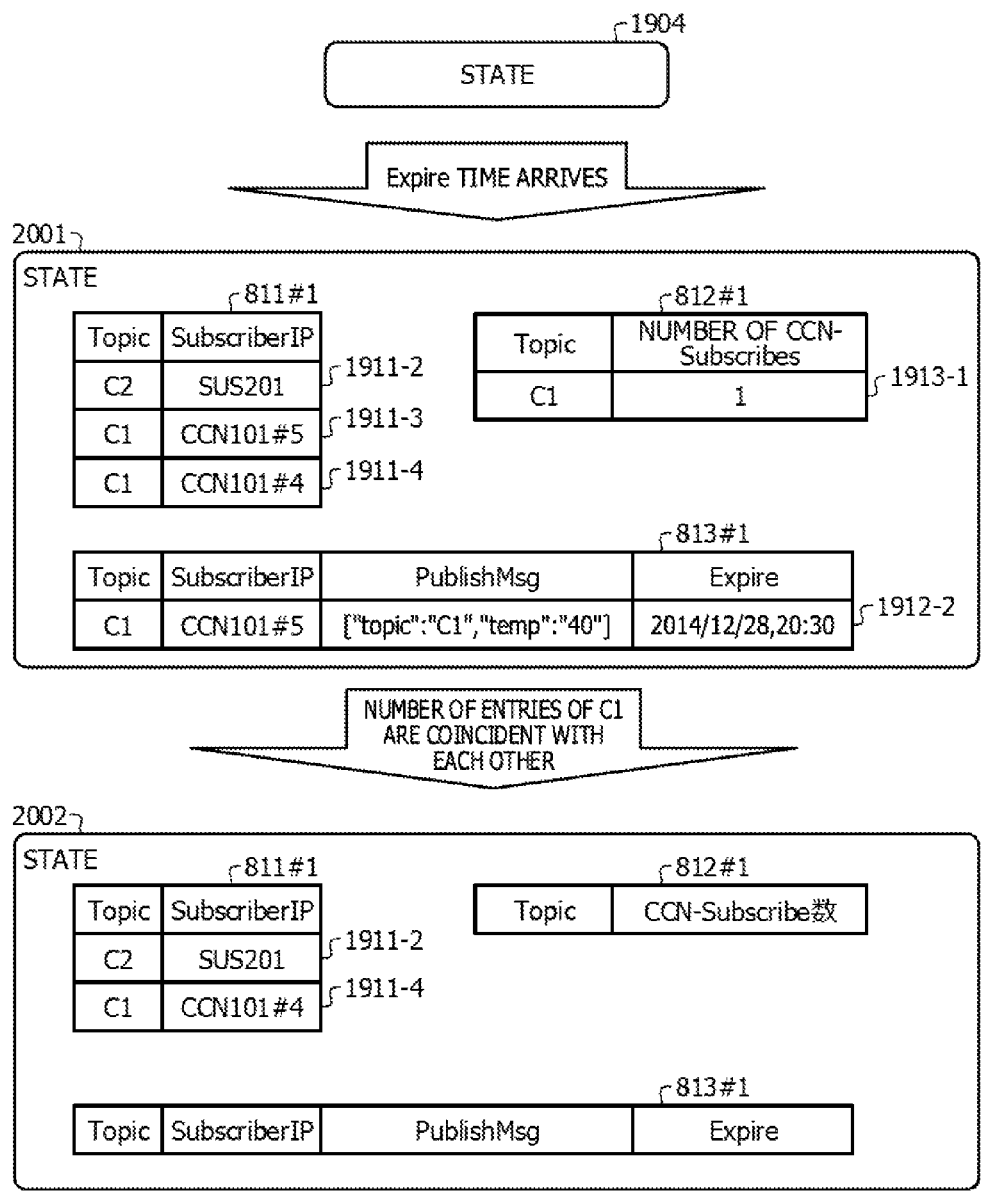
FIG. 20 is an (second) explanatory diagram illustrating an example of the stored contents of each of the lists when the Expire time arrives.

FIG. 19 is an (first) explanatory diagram illustrating an example of stored contents of each of the lists when an Expire time arrives. In addition, FIG. 20 is an (second) explanatory diagram illustrating an example of the stored contents of each of the lists when the Expire time arrives. In FIG. 19 and FIG. 20, the description will be performed by using the stored contents of a Subscriber list 811#1, a CCN-Subscribe number list 812#1, and a retransmission wait list 813#1 in the CCN 101#1.

In a state 1901 illustrated in FIG. 19, the portable terminal 102#C is in the position under the CCN 101#5 from the state illustrated in FIG. 5. In addition, in the CCN 101#5 and the portable terminal 102#C, the condition information C3 illustrated in FIG. 19 is registered. The contents of the condition information C3 are "If Receive Establishment of C1 from CCN 101#1 AND Temperature of Portable Terminal 102#C<25° C. Then Notify (Service User, Temperature of Portable Terminal 102#C)". In this state, the Subscriber list 811#1 includes entries 1911-1 to 1911-3 as illustrated in the frame of the state 1901.

After the portable terminal 102#B secedes from the state 1901, the Pub/Sub server application 701#1 receives the Publish (C1, 35) from the sensor adapter application 702#1. In this case, the Pub/Sub server application 701#1 obtains the CCNs 101#3 and 101#5 as the notification destination by referring to the Subscriber list 811#1. Then, the Pub/Sub server application 701#1 notifies the Publish (C1, 35) to the CCNs 101#3 and 101#5 which become the notification destination. The CCN 101#3 which has received the Publish (C1, 35) tries to access the portable terminal 102#B according to the condition information C2, but the portable terminal 102#2 secedes from the state 1901, and thus, the CCN 101#3 is not able to access the portable terminal 102#B. Accordingly, the CCN 101#3 transmits nack to the CCN 101#1.

A state where the CCN 101#1 receives the nack from the CCN 101#3, and the Publish with respect to the nack is registered in the retransmission wait list 813#1 is a state 1902 illustrated in FIG. 19. In this state, the retransmission wait list 813#1 includes an entry 1912-1 as illustrated in the frame of the state 1902.

After the portable terminal 102#C secedes from the state 1902, the Pub/Sub server application 701#1 receives the Publish (C1, 35) from the sensor adapter application 702#1. In this case, the Pub/Sub server application 701#1 obtains the CCNs 101#3 and 101#5 as the notification destination by referring to the Subscriber list 811#1. However, the CCN 101#3 is registered in the retransmission wait list 813, and thus, the Pub/Sub server application 701#1 notifies the Publish (C1, 35) to the CCN 101#5. The CCN 101#5 which has received the Publish (C1, 35) tries to access the portable terminal 102#C according to the condition information C3, but the portable terminal 102#C secedes from the state 1902, and thus, the CCN 101#5 is not able to access the portable terminal 102#C. Accordingly, the CCN 101#5 transmits nack to the CCN 101#1.

A state where the CCN 101#1 receives the nack from the CCN 101#5, and the Publish with respect to the nack is registered in the retransmission wait list 813#1 is a state 1903 illustrated in FIG. 19. In this state, the retransmission wait list 813#1 includes entries 1912-1 and 1912-2 as illustrated in the frame of the state 1903.

The portable terminal 102#B reaches the region of the CCN 101#4 from the state 1903. In this case, the CCN 101#4 receives the Register and the condition setting request from the portable terminal 102#B. Then, the CCN 101#4 transmits the Subscribe to the CCN 101#1 based on the condition information C2.

A state in which the Subscriber list 811#1 and the CCN-Subscribe number list 812#1 are updated by receiving the Subscribe from the CCN 101#1 is a state 1904 illustrated in FIG. 19. In this state, the Subscriber list 811#1 includes entries 1911-1 to 1911-4 to which an entry 1911-4 is added, as illustrated in the frame of the state 1904. Similarly, the CCN-Subscribe number list 812#1 includes an entry 1913-1.

In addition, in the state 1904, the Pub/Sub server application 701#1 confirms the number at each Topic with respect to the retransmission wait lists 813#1 and the CCN-Subscribe number lists 812#1, and determines whether or not the numbers are coincident with each other. In this case, in the condition information C1, the retransmission wait list 813#1 includes two entries, and the CCN-Subscribe number list 812#1 includes one entry, and thus, the numbers are different from each other. Accordingly, the Pub/Sub server application 701#1 proceeds to the next process without doing anything.

The portable terminal 102 is not registered in any CCN 101, and Expire time of the entry 1912-1 arrives from the state 1904. In this case, the Pub/Sub server application 701#1 deletes the entry 1912-1 of which the Expire time arrives from the retransmission wait list 813#1 as a process performed when Expire time arrives. In conclusion, the Pub/Sub server application 701#1 deletes the entry 1911-1 from the Subscriber list 811#1. In addition, the process performed when Expire time arrives is illustrated in FIG. 21. A state where two entries are deleted is a state 2001 illustrated in FIG. 20.

After the two entries are deleted, the Pub/Sub server application 701#1 confirms the number at each Topic with respect to the retransmission wait list 813#1 and the CCN-Subscribe number list 812#1, and determines whether or not the numbers are coincident with each other. In this case, in the condition information C1, both of the retransmission wait list 813#1 and the CCN-Subscribe number list 812#1 include one entry, and the numbers are coincident with each other. Accordingly, the Pub/Sub server application 701#1 deletes the entry 1912-2 which is the Topic in which the numbers are coincident with each other from the retransmission wait list 813#1. In conclusion, the Pub/Sub server application 701#1 deletes the entry 1911-3 from the Subscriber list 811#1. A state where two entries are deleted is a state 2002 illustrated in FIG. 20. Thus, the Pub/Sub server application 701#1 is able to stop the retransmission due to the nack.

Next, a flowchart illustrating the process performed when Expire time arrives will be described by using FIG. 21.

Figure 21:
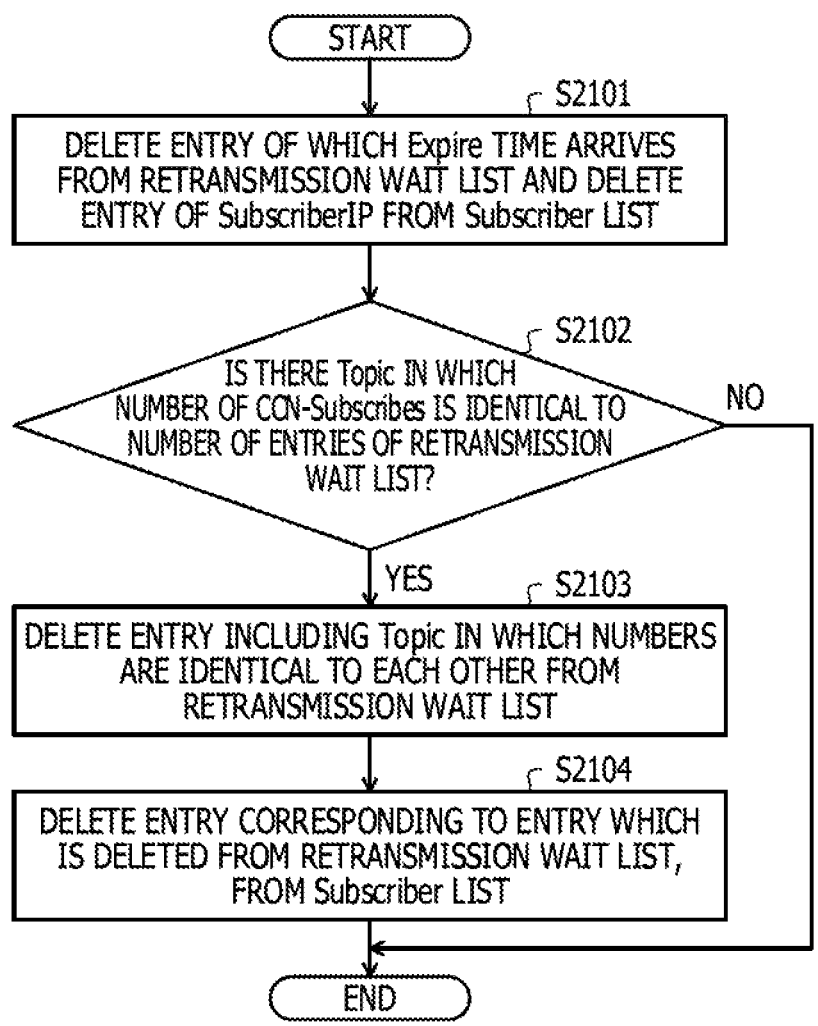
FIG. 21 is a flowchart illustrating an example of a procedure of a process when the Expire time arrives.

FIG. 21 is a flowchart illustrating an example of a procedure of the process performed when Expire time arrives. The process performed when Expire time arrives is a process which is performed when Expire time arrives.

The Pub/Sub server application 701 deletes the entry of which the Expire time arrives from the retransmission wait list 813 and deletes the entry of the SubscriberIP from the Subscriber list 811 (Step S2101). Next, the Pub/Sub server application 701 determines whether or not there is Topic in which the number of CCN-Subscribes is identical to the number of entries of the retransmission wait list 813 (Step S2102). In a case where there is Topic in which the number of CCN-Subscribes is identical to the number of entries of the retransmission wait list 813 (Step S2102: Yes), the Pub/Sub server application 701 deletes an entry including the Topic in which the numbers are identical to each other from the retransmission wait list 813 (Step S2103). Subsequently, the Pub/Sub server application 701 deletes an entry corresponding to the entry which is deleted from the retransmission wait list 813, from the Subscriber list 811 (Step S2104).

After the process of Step S2104 ends, or in a case there is no Topic in which the number of CCN-Subscribes is identical to the number of entries of the retransmission wait list 813 (Step S2102: No), the Pub/Sub server application 701 ends the process performed when Expire time arrives. By executing the process performed when Expire time arrives, the Pub/Sub server application 701 deletes the entry of which the Expire time arrives. Then, the Pub/Sub server application 701 deletes the entry, and thus, in a case where the number of CCN-subscribes is identical to the number of entries of the retransmission wait list 813, the Pub/Sub server application 701 is able to delete the entry in which the numbers are coincident with each other and to suppress the retransmission due to the nack.

As described above, according to the distributed control system 100, nack of certain Topic is received from the CCN 101#3, and Subscribe of the certain Topic is received from the CCN 101#5, and then, the Subscriber of the certain Topic is changed to the CCN 101#5. Accordingly, the distributed control system 100 is able to recognize the movement of the portable terminal 102#B and to continue the distributed process.

In addition, according to the distributed control system 100, in a case where the Subscribe is notified after the Publish, it may be determined whether or not the number of CCNs 101 included in the retransmission wait list 813 is coincident with the number of CCNs 101 which have transmitted the Subscribe at each Topic. Accordingly, even in a case where the Subscribe is notified after the Publish, the distributed control system 100 is able to stop the retransmission due to the nack.

In addition, according to the distributed control system 100, in a case where the Subscribe is notified before the Publish, it may be determined whether or not the number of CCNs 101 included in the retransmission wait list 813 is coincident with the number of CCNs 101 which have transmitted the Subscribe at each Topic. Accordingly, even in a case where the Subscribe is notified before the Publish, the distributed control system 100 is able to stop the retransmission due to the nack.

In addition, according to the distributed control system 100, in a case where the Expire time arrives, it may be determined whether or not the number of CCNs 101 included in the retransmission wait list 813 is coincident with the number of CCNs 101 which have transmitted the Subscribe at each Topic. Accordingly, when the Expire time arrives, the distributed control system 100 is able to stop the retransmission due to the nack.

Then, by stopping the retransmission due to the nack, it is possible to reduce costs for a network and the process of the sensor adapter application 702. For example, in a case where the upper limit of the number of times of performing retransmission is 10 times, such costs becomes less than or equal to $1/10$ at most. In addition, in the method according to this embodiment, implementation costs also decrease, compared to a method in which a sensor adapter application of a move destination is transmitted to a sensor adapter application of a move source.

Furthermore, the distributed control method described in this embodiment is able to be realized by executing a program prepared in advance using a computer such as a personal computer or a workstation. This distributed control program is stored in a computer readable storage medium such as a hard disk, a flexible disk, compact disc-read only memory (CD-ROM), and a digital versatile disk (DVD), and is executed by being read from the storage medium using the computer. In addition, this distributed control program may be distributed through a network such as internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A distributed control method in a distributed control system including a plurality of notification devices and a plurality of detection devices, each of the plurality of detection devices notifying detection of an event to a notification device that corresponds to a position of the detection device among the plurality of notification devices, the distributed control method including a process executed by a first notification device included in the plurality of notification devices, the process comprising:

notifying a detection of a first event to a second notification device included in the plurality of notification devices when the detection of the first event is received from first detection device included in the plurality of detection devices detecting the first event, the first notification device being capable of receiving a detection of the first event from the first detection device, the second notification device being capable of receiving a detection of a second event from a second detection device included in the plurality of detection devices detecting the second event, the second notification device having condition information indicating a specified condition for generating notification for user, the specified condition being that the detection of the first event is notified and the detection of the second event is received;

storing, in a storage device, acknowledgement information associating an event identifier indicating the first event with a device identifier indicating the second notification device when a negative acknowledgement indicating that a processing according to the detection of the first event is not able to be executed is received from the second notification device;

determining whether the event identifier indicating the first event is stored in the storage device or not when a request for a notification of the detection of the first event is received from a third notification device included in the plurality of notification devices, the third notification device being capable of receiving a detection of the second event from the second detection device that has moved from a position under the second notification device to a position under the third notification device, the third notification device obtaining the specified condition from the second notification device via the second detection device; and deleting, from the storage device, a device identifier associated with the event identifier indicating the first event when it is determined that the event identifier indicating the first event is stored in the storage device.

2. The distributed control method according to claim 1, wherein the processing according to the detection of the first event includes an access to the plurality of detection devices to receive the detection of the second event.

3. The distributed control method according to claim 1, wherein, in the determining, it is determined whether or not number of pieces of the device identifier associated with the event identifier indicating the first event included in the storage device is equal to number of notification devices which have transmitted the request for the notification of the detection of the first event when the request from the third notification device is received after receiving the negative acknowledgement; and wherein, in the deleting, the device identifier associated with the event identifier indicating the first event is deleted from the storage device when it is determined that the number of pieces of the device identifier associated with the event identifier indicating the first event included in the storage device is equal to the number of notification devices which have transmitted the request for a notification of the detection of the first event.

4. The distributed control method according to claim 1, wherein, in the notifying process, the detection of the first event is further notified to the third notification device when the detection of the first event is received from the first detection device before receiving the negative acknowledgement and after receiving the request from the third notification device, wherein, in the determining, it is determined whether or not the number of pieces of the device identifier associated with the event identifier indicating the first event included in the storage device is equal to the number of notification devices which have transmitted the request for the notification of the detection of the first event in response to receiving of the negative acknowledgement;

wherein the storage device further storing notification destination information associating the event identifier indicating the first event with the device identifier indicating the second notification device; and wherein, in the deleting, wherein, in the deleting, the device identifier associated with the event identifier indicating the first event is deleted from both the acknowledgement information and the notification destination information when it is determined that the number of pieces of the device identifier associated with the event identifier indicating the first event included in the acknowledgement information is equal to the number of notification devices which have transmitted the request for a notification of the detection of the first event.

5. The distributed control method according to claim 1, wherein in the storing, the device identifier is further associated with a value indicating a time limit based on a time of receiving the negative acknowledgement, wherein in the determining, it is determined whether or not number of pieces of the device identifier associated with the event identifier indicating the first event included in the storage device is equal to number of notification devices which have transmitted the request for the notification of the detection of the first event when a current time becomes the time limit, and wherein, in the deleting, the device identifier associated with the event identifier indicating the first event is deleted from the storage device when it is determined that the number of pieces of the device identifier associated with the event identifier indicating the first event included in the storage device is equal to the number of notification devices which have transmitted the request for a notification of the detection of the first event.

6. A distributed control system, comprising:
a plurality of notification devices, each of the plurality of notification devices including:
  a first memory; and
  a first processor coupled to the first memory; and
a plurality of detection devices, each of the plurality of detection devices including:
  a second memory; and
  a second processor coupled to the second memory and the second processor configured to:
    notify detection of an event to a notification device determined based on a position of the at least one detection device in the plurality of notification devices; wherein
a first notification device is included in the plurality of notification devices, the first processor included in the first notification device being configured to:
  notify a detection of a first event to a second notification device included in the plurality of notification devices when the detection of the first event is received from a first detection device included in the plurality of detection devices detecting the first event, the first notification device being capable of receiving a detection of the first event from the first detection device, the second notification device being capable of receiving a detection of a second event from the a second detection device included in the plurality of detection devices detecting the second event, the second notification device having condition information indicating a specified condition for generating notification for user, the specified condition being that the detection of the first event is notified and the detection of the second event is received;
  store, in the memory, acknowledgement information associating an event identifier indicating the first event with a device identifier indicating the second notification device when a negative acknowledgement indicating that a processing according to the detection of the first event is not able to be executed is received from the second notification device;

determine whether the event identifier indicating the first event is stored in the memory or not when a request for a notification of the detection of the first event is received from a third notification device included in the plurality of notification devices, the third notification device being capable of receiving a detection of the second event from the second detection device that has moved from a position under the second notification device to a position under the third notification device, the third notification device obtaining the specified condition from the second notification device via the second detection device; and delete, from the memory, a device identifier associated with the event identifier indicating the first event when it is determined that the event identifier indicating the first event is stored in the memory.

7. A non-transitory computer-readable storage medium storing a distributed control program that causes a first notification device included in the distributed control system to execute a process, the distributed control system including a plurality of notification devices and a plurality of detection devices, each of the plurality of detection devices notifying detection of an event to a notification device determined based on a position of the at least one detection device in the plurality of notification devices, the process comprising:

notifying a detection of a first event to a second notification device included in the plurality of notification devices when the detection of the first event is received from a first detection device included in the plurality of detection devices detecting the first event, the first notification device being capable of receiving a detection of the first event from the first detection device, the second notification device being capable of receiving a detection of a second event from a second detection device included in the plurality of detection devices detecting the second event the second notification device having condition information indicating a specified condition for generating notification for user, the specified condition being that the detection of the first event is notified and the detection of the second event is received;

storing, in a storage device, acknowledgement information associating an event identifier indicating the first event with a device identifier indicating the second notification device when a negative acknowledgement indicating that a processing according to the detection of the first event is not able to be executed is received from the second notification device;

determining whether the event identifier indicating the first event is stored in the storage device or not when a request for a notification of the detection of the first event is received from a third notification device included in the plurality of notification devices, the third notification device being capable of receiving a detection of the second event from the second detection device that has moved from a position under the second notification device to a position under the third notification device, the third notification device obtaining the specified condition from the second notification device via the second detection device; and deleting, from the storage device, a device identifier associated with the event identifier indicating the first event when it is determined that the event identifier indicating the first event is stored in the storage device.

* * * * *